US011071901B2

(12) United States Patent
Morton et al.

(10) Patent No.: US 11,071,901 B2
(45) Date of Patent: *Jul. 27, 2021

(54) MISSION-BASED, GAME-IMPLEMENTED CYBER TRAINING SYSTEM AND METHOD

(71) Applicant: Circadence Corporation, Boulder, CO (US)

(72) Inventors: Gary D. Morton, Erie, CO (US); Mark Mihelic, Boulder, CO (US); Michael Moniz, Boulder, CO (US); Paul R. Thornton, Tupelo, MS (US); Ryan Pressley, Saltillo, MS (US); Laura Lee, San Diego, CA (US)

(73) Assignee: Circadence Corporation, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/726,434

(22) Filed: Dec. 24, 2019

(65) Prior Publication Data

US 2020/0215414 A1     Jul. 9, 2020

Related U.S. Application Data

(63) Continuation of application No. 16/195,322, filed on Nov. 19, 2018, now Pat. No. 10,518,162, which is a
(Continued)

(51) Int. Cl.
*A63F 13/85*     (2014.01)
*A63B 71/06*     (2006.01)
(Continued)

(52) U.S. Cl.
CPC ............ *A63B 71/0622* (2013.01); *A63F 9/24* (2013.01); *A63F 13/85* (2014.09); *G06N 3/006* (2013.01);
(Continued)

(58) Field of Classification Search
CPC ........ A63B 71/0622; G09B 5/12; G09B 7/00; G09B 9/003; G06N 3/006; G06N 3/0427;
(Continued)

(56) References Cited

U.S. PATENT DOCUMENTS 7,474,429 B2    1/2009   Morooka et al.
7,837,543 B2 *   11/2010   Graepel ................. A63F 13/10
                                                         463/1

(Continued)

FOREIGN PATENT DOCUMENTS

AU     2016327973     1/2020
JP     2013236687     11/2013
(Continued)

OTHER PUBLICATIONS

International Search Report and Written Opinion for International Application No. PCT/US2016/53430 dated Dec. 29, 2016, 9 pages.
(Continued)

*Primary Examiner* — Masud Ahmed
(74) *Attorney, Agent, or Firm* — Weide & Miller, Ltd.

(57) ABSTRACT

A mission-based cyber training platform allows both offensive and defensive oriented participants to test their skills in a game-based virtual environment against a live or virtual opponent. The system builds realistic virtual environments to perform the training in an isolated and controlled setting. Dynamic configuration supports unique missions using a combination of real and/or virtual machines, software resources, tools, and network components. Game engine behaves in a manner that will vary if participant attempts to replay a scenario based upon alternate options available to the engine. Scoring and leader boards are used to identify skill gaps/strengths and measure performance for each train-
(Continued)

ing participant. A detailed assessment of a player's performance is provided at the end of the mission and is stored in a user profile/training record.

20 Claims, 26 Drawing Sheets

Related U.S. Application Data continuation of application No. 15/466,833, filed on Mar. 22, 2017, now Pat. No. 10,238,948, which is a continuation-in-part of application No. 15/274,096, filed on Sep. 23, 2016, now Pat. No. 10,056,005.

(60) Provisional application No. 62/232,423, filed on Sep. 24, 2015.

(51) Int. Cl.
| | |
|---|---|
| *G06N 3/00* | (2006.01) |
| *A63F 9/24* | (2006.01) |
| *G09B 5/12* | (2006.01) |
| *G09B 7/00* | (2006.01) |
| *G09B 9/00* | (2006.01) |
| *A63F 13/75* | (2014.01) |
| *G06N 3/04* | (2006.01) |

(52) U.S. Cl.
CPC ............... *G09B 5/12* (2013.01); *G09B 7/00* (2013.01); *G09B 9/003* (2013.01); *A63F 13/75* (2014.09); *A63F 2300/8094* (2013.01); *G06N 3/0427* (2013.01)

(58) Field of Classification Search
CPC .. A63F 13/85; A63F 9/24; A63F 13/75; A63F 2300/8094
USPC ...................................................... 463/16–43
See application file for complete search history.

(56) References Cited

U.S. PATENT DOCUMENTS

| | | | |
|---|---|---|---|
| 8,005,879 | B2 | 8/2011 | Bornhoevd et al. |
| 8,099,272 | B2 | 1/2012 | Conway |
| 8,266,320 | B1 | 9/2012 | Bell et al. |
| 8,554,536 | B2 | 10/2013 | Adelman et al. |
| 8,751,629 | B2 | 6/2014 | White et al. |
| 9,076,342 | B2 | 7/2015 | Brueckner et al. |
| 9,246,768 | B2 | 1/2016 | White et al. |
| 9,697,355 | B1 | 7/2017 | Park et al. |
| 10,056,005 | B2 | 8/2018 | Morton et al. |
| 10,238,948 | B2 | 3/2019 | Morton et al. |
| 10,518,162 | B2 | 12/2019 | Morton et al. |
| 2003/0046689 | A1 | 3/2003 | Gaos |
| 2005/0192870 | A1 | 9/2005 | Geddes |
| 2007/0066403 | A1* | 3/2007 | Conkwright ............ A63F 13/10 463/43 |
| 2008/0108021 | A1 | 5/2008 | Slayton et al. |
| 2009/0208910 | A1 | 8/2009 | Brueckner et al. |
| 2009/0254842 | A1 | 10/2009 | Leacock et al. |
| 2009/0320137 | A1 | 12/2009 | White et al. |
| 2011/0257961 | A1 | 10/2011 | Tinkler et al. |
| 2012/0058829 | A1* | 3/2012 | Yanagisawa ............ A63F 13/56 463/43 |
| 2012/0084242 | A1* | 4/2012 | Levin .................... B82Y 10/00 706/46 |
| 2013/0014264 | A1 | 1/2013 | Kennedy et al. |
| 2013/0288788 | A1* | 10/2013 | Lim ...................... A63F 13/795 463/31 |
| 2014/0120993 | A1* | 5/2014 | Tsuchiya ................ A63F 13/10 463/4 |
| 2014/0186801 | A1* | 7/2014 | Slayton .................. A63F 13/04 434/16 |
| 2014/0199663 | A1 | 7/2014 | Sadeh-Koniecpol et al. |
| 2015/0040033 | A1 | 2/2015 | Kurtz et al. |
| 2015/0050623 | A1* | 2/2015 | Falash ...................... G09B 9/24 434/38 |
| 2015/0143374 | A1 | 5/2015 | Banga et al. |
| 2015/0229664 | A1 | 8/2015 | Hawthorn et al. |
| 2015/0231502 | A1 | 8/2015 | Allen et al. |
| 2017/0032694 | A1 | 2/2017 | Brueckner et al. |
| 2017/0103783 | A1 | 4/2017 | Paglia et al. |
| 2017/0140660 | A1 | 5/2017 | Morton et al. |
| 2017/0140663 | A1 | 5/2017 | Sadeh-Koniecpol et al. |
| 2017/0244746 | A1 | 8/2017 | Hawthorn et al. |
| 2017/0304707 | A1 | 10/2017 | Morton et al. |

FOREIGN PATENT DOCUMENTS

| | | |
|---|---|---|
| SK | 10-2009-0015421 | 2/2009 |
| SK | 10-1534194 | 7/2015 |

OTHER PUBLICATIONS

International Search Report and Written Opinion for International Application No. PCT/US2018/23523 dated Jun. 1, 2018, 9 pages.
International Search Report and Written Opinion for International Application No. PCT/US2018/47509 dated Oct. 29, 2018, 14 pages.
Price et al., Asset Criticality in Mission Reconfigurable Cyber Systems and its Contribution to Key Cyber Terrain, Proceedings of the 50th Hawaii International Conference on System Sciences, Jan. 2017, retrieved from https://scholarspace.manoa.hawaii.edu/handle/10125/41893, 1 page.
Ernits et al., i-tee: A fully automated Cyber Defense Competition for Students, Copyright 2015, 2 pages.
European Search Report for Application No. 16849744.4, dated Jan. 16, 2019, 12 pages.
Office Action Report for Korean Patent Application No. 10-2018-7011555, dated Apr. 4, 2019, 17 pages.
Search Report and Written Opinion for Singapore Patent Application No. 11201802370P, dated Jul. 16, 2019, 11 pages.
Office Action for Japanese Patent Application No. 2018-536063, dated Feb. 4, 2020, 6 pages.
Examination Report for European Patent Application No. 16849744.4, dated Feb. 1, 2020, 11 pages.
Notice of Patent Grant for Korean Patent Application No. 10-2018-7011555, dated Feb. 28, 2020, 4 pages.

* cited by examiner

MISSION-BASED, GAME-IMPLEMENTED CYBER TRAINING SYSTEM AND METHOD

RELATED APPLICATION DATA

This application is a continuation of U.S. application Ser. No. 16/195,322, filed Nov. 19, 2018, which is a continuation of U.S. application Ser. No. 15/466,833, filed Mar. 22, 2017, now U.S. Pat. No. 10,238,948, which is a continuation-in-part of U.S. application Ser. No. 15/274,096, filed Sep. 23, 2016, now U.S. Pat. No. 10,056,005, issued Aug. 21, 2018 which claims priority to U.S. Provisional Application Ser. No. 62/232,423, filed Sep. 24, 2015, the contents of which are incorporated herein in their entirety by reference.

FIELD OF THE INVENTION

The present invention relates to computer-implemented training systems and methods.

BACKGROUND OF THE INVENTION

With the growing reliance on information systems technology and the Internet, the number of cyber-attacks is increasing at an alarming rate. Further complicating the issue, cyber threats are continuing to evolve with increasing complexity impacting consumers, businesses and governmental entities every day. Hacking attempts are on the rise throughout government and private industry. According to cyber threat information provided by the Department of Homeland Security, the Pentagon reports getting 10 million hacks per day, the State of Utah faces 20 million attempts, and the energy company BP says it deals with 50,000 attempts per day. But these are only a small sample of the daily threats being encountered by information systems. Even more disconcerting is that many of these attacks are successful each year, costing hundreds of billions of dollars.

As cyber-attacks continue to increase and become more sophisticated, the need for security systems and highly trained experts to protect industry and government information systems is growing just as fast. This rapidly growing cyber security threat landscape coupled with the shortage of personnel with the expertise required to safeguard critical systems and sensitive information poses a serious security risk for the public and private sectors.

Unfortunately, current training methods are severely challenged to keep up-to-date and provide the training necessary to combat the threat. This highly complex security training has traditionally occurred in the classroom or has been provided by consultants with access to live systems evaluating real-time security threats as they occur. These existing training methodologies and techniques cannot keep up with the rapidly changing security threats nor can they train personnel fast enough. To further complicate existing training programs, real-life cyber threat scenarios become outdated by new threats shortly after training is introduced.

Current training systems are built with the specific target for training in mind and dedicated to staff and students as such. For example, some of these targets may include healthcare, cybersecurity, power grid network infrastructure, etc. Current training systems are customized with hardware, software, and built to satisfy the training needs of the targeted industry. Present day systems are generally static in nature and configured once for the targeted industry, then modified manually as training needs and technology changes.

This focused manual customization for each industry target in need of training increases the cost of the overall training system development and support, making current training systems expensive and too costly for most businesses desperately in need of such state of the art training. Such legacy training systems require extensive manual modification and on-going customization to keep up with the student's training needs and the rapid pace of technology evolution in each particular industry where training is required. This fast-paced evolution of technology quickly makes training systems obsolete and in need of revision to keep up with the continual flow of new students, new systems and new operational methods.

Further, even in those situations where computer implemented training systems have been developed, those systems suffer from similar problems. While these systems can be used to train a larger numbers of students, the training systems are not flexible and provide limited training benefits. For example, existing training systems are designed to implement fixed training sessions. That is, these training systems include one or more predesigned or fixed training applications. The training system simply implements that single fixed training application or selects from one of a small set of fixed training application. Thus, students see the same training environments over and over. If the operator desires to present student with a different training session or environment, an entirely new training application must be built and loaded into the training system.

This "select from fixed training sessions" configuration is consistent with the goal of existing training sessions: to create a training session in which a student practices or implements one or more specific tasks. In accordance with the task-based training, the training is used to train the student on a particular task and to increase their proficiency in implementing the task. However, in the real world, each cyber threat is very different. Thus, a student's ability to perform a particular designated task is insufficient in helping the student understand when to perform the task or how to use it in conjunction with other tasks or techniques in order to address a cyber threat.

Given the rapidly changing cyber threat risk and the constant attacks from hackers around the world, a dynamic, virtual network training system and method are needed to provide an isolated and controlled network environment with the level of complexity needed to train experts how to rapidly respond to cyber-attacks, terrorism, and cyber-crime, and how to stop them. The disclosed training system invention solves the major problem of the time required to continuously program and adapt legacy training systems to keep up with rapidly changing cyber training needs.

SUMMARY OF THE INVENTION

One aspect of the invention is a cyber training system. In one embodiment, training which is implemented by the cyber training system is mission-based, rather than task based. In one embodiment, the training which is implemented by the cyber training system is also implemented as a game.

In one embodiment, the system includes a core set of databases, tools and Application Programming Interfaces (APIs) to generate a nearly infinite variety of training system configurations comprising different environments with different resources, and having different missions.

The system may be configured with a game engine and a Virtual Environment Manager (VEM) which are configured to implement and/or manage: (1) a plurality of scenario environment types such as: cyber threat, power grid, custom systems, etc.; (2) a plurality of unique resource and mission databases, each dedicated to an environment type; (3) a core set of tools and resources common to all environment types; (4) the selection of an environment type, use of dedicated databases, and configuration of a unique environment; (5) use of both host-based and network-based sensors; (6) game play between at least two live students or between a live student and an artificial intelligence (AI) computerized player and/or (7) game play between a live student and a live instructor/trainer.

In one embodiment, the invention comprises a dynamic, scenario-based training platform to allow both "offensive" and "defensive" oriented participants to test their skills in a game environment against a sophisticated opponent.

In one embodiment, the training takes place within the framework of a game environment combining an AI opponent within a realistic virtual environment and hacking simulation. The game environment provides dynamic and highly interactive scenarios to facilitate realistic situational training within a controlled environment. This unique use of systems technology, simulation and game interface facilitates the training of personnel to rapidly develop the skillsets needed for the cyber security expertise needed across both industry and governmental information technology entities.

Moreover, many organizations would like to avoid performing penetration testing on their production networks for a variety of reasons including the risk to disrupting functionality and system operation, or potential vulnerabilities or malicious implants being introduced by the external penetration testing teams and tools. By capturing essential network elements and components such as topology maps, component lists, host types and configurations, to name a few, extensible virtualized environments can emulate the key aspects of the production networks. Such virtual environments, comprised of a plurality of virtual machines, are more efficient than a fixed hardware configuration by reducing the number of hardware components and the associated maintenance costs. As such, penetration testing and related activities can be performed in a safe and isolated manner on the virtualized environment at a much higher frequency, and the lessons-learned about discovered vulnerabilities, weaknesses, strengths, and impacts can be applied to the production network in a methodical and controlled manner.

In alternative embodiments, a specific targeted hardware device such as part of an industrial control system may be required to co-exist with virtual network elements and components to collectively form an extensible virtualized and physical environment that properly emulates a targeted production network.

Other aspects and components of the disclosed system may include:

(1) An AI opponent implemented by an AI engine, used in cyber security training and practice settings. The AI engine makes each game unique depending on how the training participant reacts to the uniquely configured system-network simulation.

(2) The system builds realistic virtual environments to perform the training in an isolated and controlled setting. The system may facilitate the building of: (a) unique virtual environments for each cyber training mission; (b) use of virtual environments in order to expand the scale of the training simulation by taking advantage of cloud based compute, network, and storage resources; (c) use of both host-based and network-based sensors for use in evaluating student activities during mission; and (d) use of specific hardware components, such as unique controllers, processors and peripheral devices required to emulate a specific target or production environment.

(3) Implementation of both offensive and defensive cyber training missions.

(4) Scoring and leader boards to identify skill gaps/strengths and measure performance for each participant playing the game.

(5) Game like visualization and multi-media stimulation to make the cyber security training more engaging for the participants.

(6) A mission oriented scenario-based training environment with unique training objectives for each mission. New missions can be constructed purely in a description language, then fed to the training environment, which will construct the environments with the necessary compute, network, storage requirements, tools, sensors, threats and mitigations to execute a mission.

(7) The system can be configured to support a wide variety of industry and training needs wherein unique computing and network environments are provided for each mission presented to one or more students.

(8) A closed network environment to isolate the training scenario and control it.

(9) Dynamic configuration to support unique missions using a combination of virtual machines (and in some cases, real devices), software resources, tools, and network components are configured for every mission.

(10) Missions including at least one live student (student) and one AI or Live instructor.

(11) Team play which allows two or more live offensive students to play against one or more defensive students or two or more defensive students to play against one or more offensive students. Offensive or defensive students can be human or AI.

(12) Student selection of the role they will take on during the mission. Students may take on offensive or defensive roles with each having objectives that relate to points to track how the student is doing.

(13) Trainers which monitor each mission with the ability to join the mission to guide students, modify settings and challenge players in objectives and scenario situations in real-time.

(14) Dynamic updates to resources as new resources become available and dynamic updates to missions as new requirements are defined.

(15) An AI advisor which is capable of receiving messages or inquiries from a student during a mission and to provide intelligent responses, such as hints or tips.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Overview

This invention comprises various embodiments of systems, methods, and apparatus for providing dynamically configured, closed network-environment training to one or more students. Because the system herein provides training in a game format, the students may also be referred to as participants, users or players.

One aspect of the present disclosure relates to a system which is configured to generate a configurable, virtual computing, cyber threat training environment wherein scenario-based or oriented missions are defined and implemented. A scenario is comprised of a virtual network of computer hosts, a threat or threat actor, mission objectives, training goals and tools to form a mission training session. The missions are game-based activities which embody a scenario to provide context and an environment to challenge one or more players to achieve the training goals via one or more tasks. In one embodiment, missions have parameters (such as variable cyber ranges with different services, operating systems, vulnerabilities, location of malware, etc.), where those parameters are randomized, ensuring that students cannot memorize tasks and solutions, but are instead presented with new and challenging missions each time. In other words, missions are preferably designed to be dynamic and random.

Figure 1:
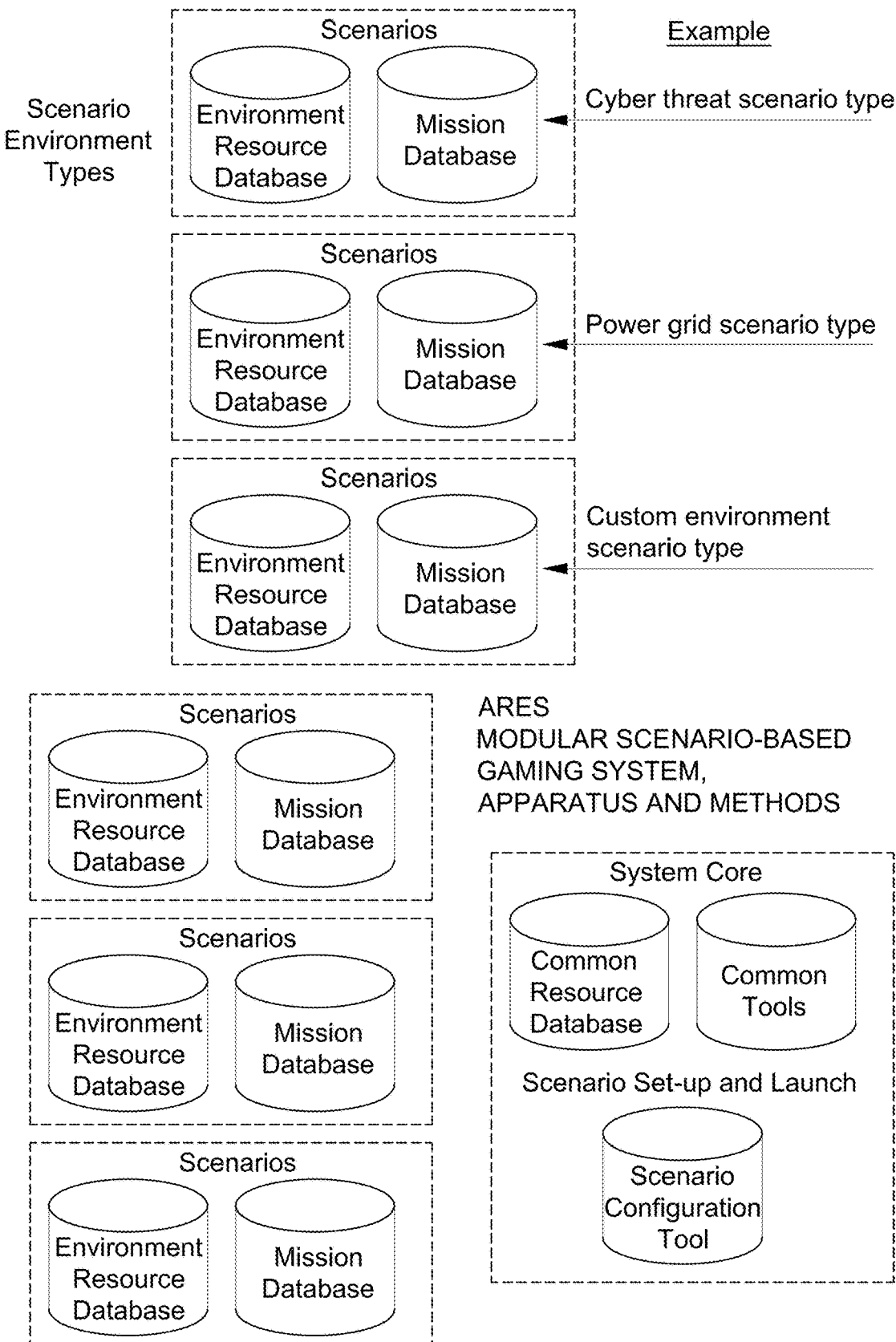
FIG. 1 diagrammatically illustrates mission scenarios of various types which may be implemented in accordance with the present invention.
Figure 2:
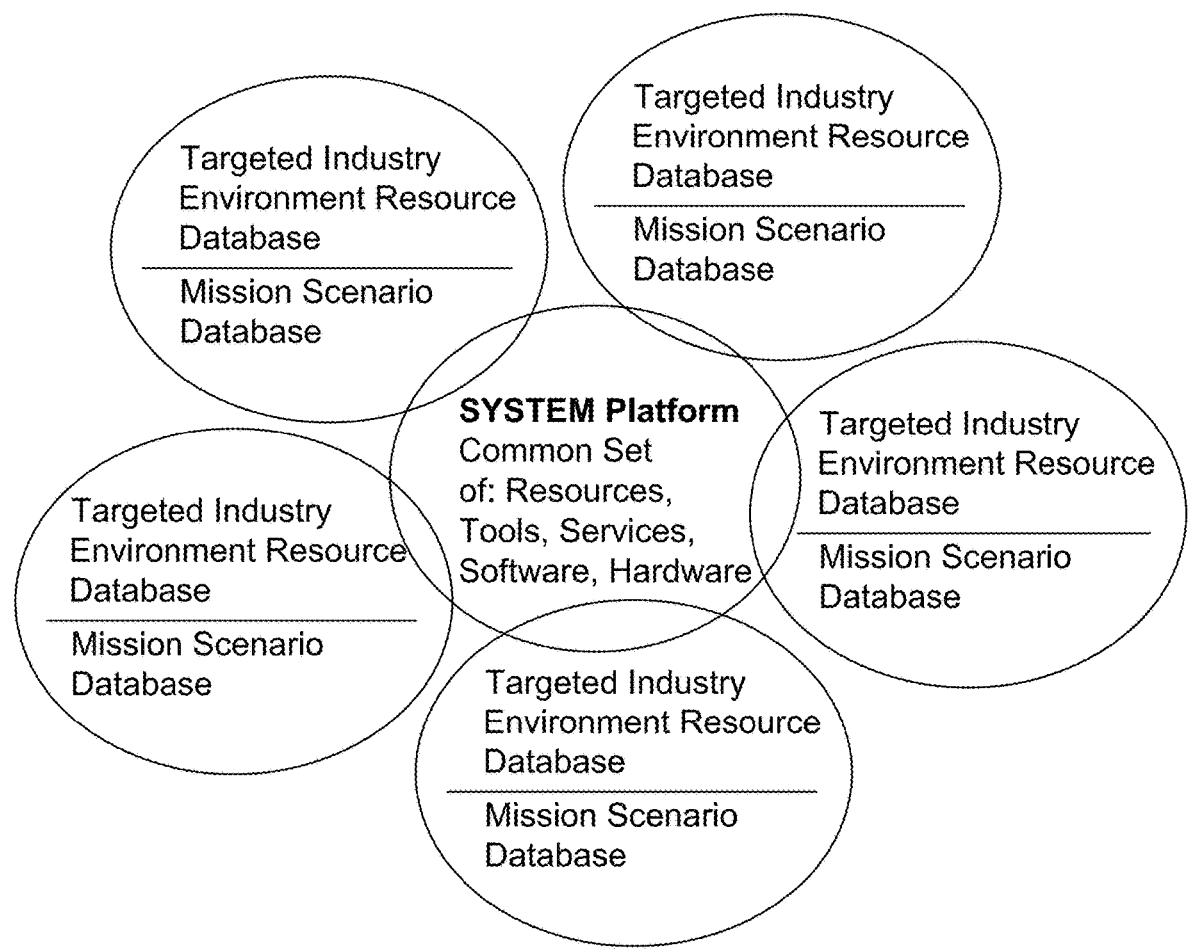
FIG. 2 diagrammatically illustrates an overview of a training system of the invention as such relates to different target industries.

In order to optimize the deployment of a dynamic training system that can support a plurality of industry targets and keep pace with the rapid pace of technology change, the present system may be comprised of a kernel of core system platform resources common to all types of training with a plurality of training environment resource and mission database sets, wherein each set is used for a targeted industry. See FIGS. 1 and 2.

The system configures different missions, each having a unique set of environment resources which are arranged in a particular manner and which have one or unique objectives, whereby every student training session is configurable as a unique mission. In this manner, the system uniquely configures the student's environment, within a virtual closed network environment, with a dynamic set of real-time resources, tools and services to facilitate a specific training scenario for a student in a specific type of industry or activity.

Figure 3:
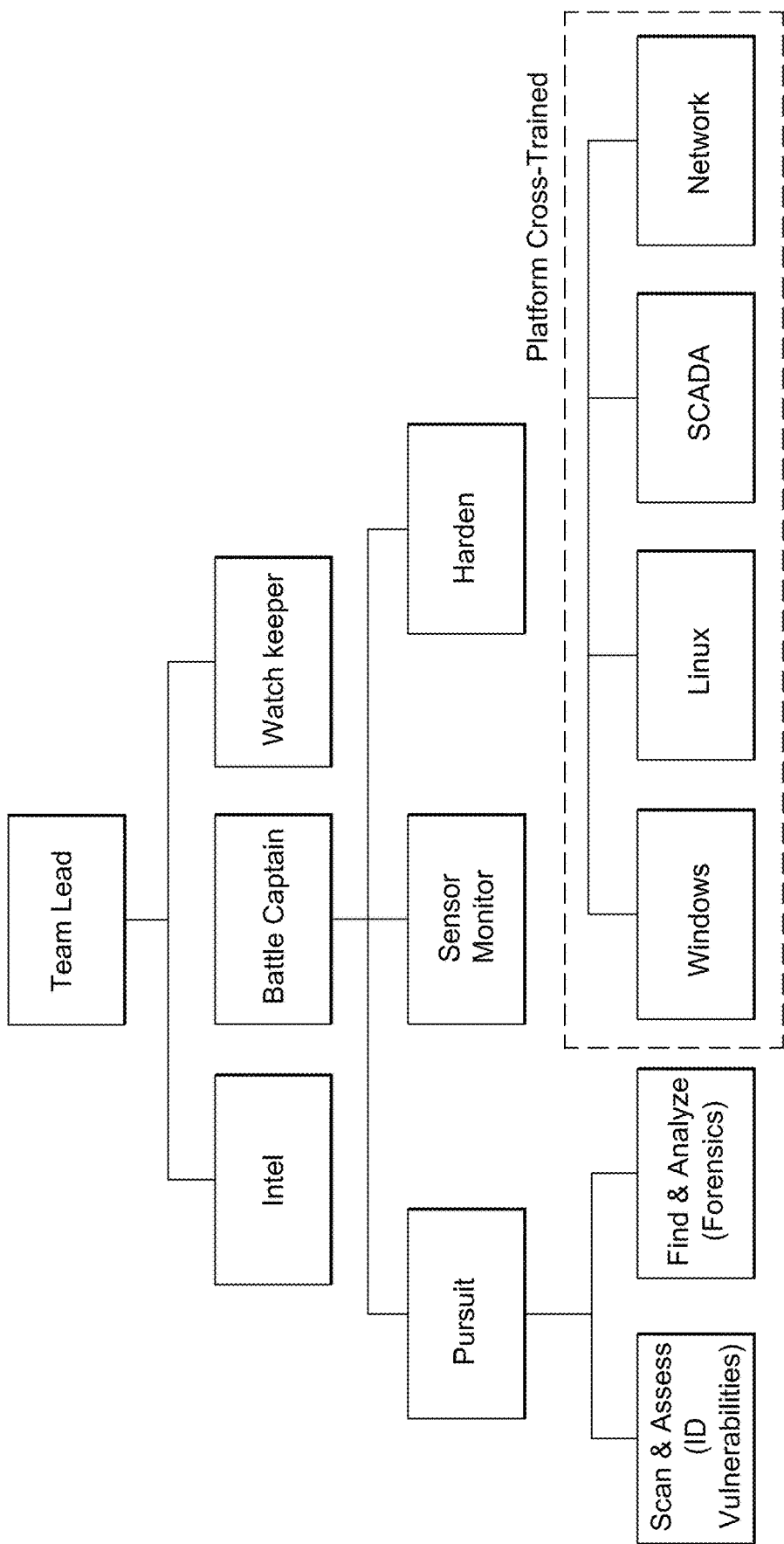
FIG. 3 illustrates various user roles which may be implemented by the training system of the present invention.

Students take on unique roles that emulate jobs in the target industry or functions, such as hacker, cyber offensive operator, cyber defender, or training instructor. Roles may change from mission to mission. The roles may be selected or be defined by one or more databases of predefined roles used for many different missions. Roles may also be defined in customized groups to emulate real-life organizations to further enhance the realistic nature of a particular set of missions. One example of a group of roles used to accomplish a variety of mission activities is illustrated in FIG. 3.

Training scenarios and the corresponding missions are implemented as game sessions wherein at least one live student plays against another live student or an AI or Live instructor. Other embodiments of the system allow team play where two or more live offensive students play against an AI defensive student or two or more live defensive students play against an AI offensive student or one or more live students or instructors.

In the preferred embodiment, the system enables or includes a user interface which implements three different phases of operation: 1) a preparation/mission proficiency phase (Phase I); 2) a mission play/execution phase (Phase II); and 3) an assessment phase (Phase III).

The system operation starts the game in the Phase I where the user selects a specific mission, skill level, learns the mission objectives and uses the interface to perform any necessary mission preparation including taking proficiency quizzes. The game then proceeds to Phase II where the user is immersed in the game trying to accomplish the mission objectives. After the mission play is over, the game transitions to the assessment phase where the player learns what happened and what they did (strengths/weaknesses). This process includes a complete walk through of an after-action report covering the mission in detail.

As used herein, the term "offensive" may refer to types of activities generally undertaken for penetration testing of a target information system ("InfoSys") by information security ("InfoSec") professionals. The term "defensive" may refer to types of activities generally undertaken by an information assurance ("IA") professional for protection of an InfoSys.

In team play, each student may take on a specific role with a unique set of objectives. For example, in one embodiment, an offensive student may take the role of a hacker while a defensive student may take the role of a power infrastructure operator or network analyst, wherein the hacker attempts to gain access to the power grid. In another embodiment, one student may take on the role of network administrator while the AI opponent may take on the role of a terrorist attempting to hack a targeted website to gain access to backend systems.

The object of the game-style mission may be to complete a plurality of objectives within a predefined time limit. In one embodiment, the games or missions are scored. Based on points and other criteria students earn during missions, a student is scored and may be listed on a leaderboard where teacher/observers can monitor mission results and how the student rates to other students. As described below, a student's skill points are used to award badges and certification in a work role, such as a host analyst or network infrastructure technician.

The system enables rapid deployment of an infinitely flexible training system to a targeted industry while minimizing cost by the use of a kernel that is maintained for all training systems.

Given the infinitely flexible nature of the disclosed training system due to the combinations and permutations of various training configurations and scenarios, and the vast amount of associated data, data mining is used by the system as an integral part of coding programs to use the information, statistics and data necessary to provide dynamic mission scenarios.

Data mining is not a method to prove a hypothesis, but is rather a method for framing various hypotheses. As such, it is used by the system to assess possible answers to questions. For example, collected data may be used to ask questions, such as: What are the patterns? Which statistics are the most surprising? What is the correlation between features A and B?

The data mining aspect of the system serves as a foundation for both artificial intelligence and machine learning system functions in order to cull and then aggregate information collected by the system. The mined data (and the accompanying patterns and hypotheses) are then used as the basis for both artificial intelligence and machine learning components incorporated by the disclosed system.

The system preferably utilizes various artificial intelligence features, such as AI opponents. "Artificial Intelligence" is a broad term referring to computational systems being capable of finding solutions to problems on their own. Instead of the solutions being hardcoded into the program as the in the case of deterministic logic, the information needed to get to the solution is coded and AI uses the data and calculations to dynamically discover solutions on its own.

The system further incorporates machine learning (ML) features to process the vast amount of data collected and mined by the disclosed system in order to provide dynamic training scenarios and solutions. Often confused with AI, ML takes the process one step further by offering the data necessary for the training system to learn and adapt when exposed to new data. ML is essentially machine training: It leverages DM and AI by reading mined data, creating a new algorithm through AI, and then updating current algorithms accordingly to "learn" a new task.

The system's ML features are capable of generalizing information from large data sets, and then detect and extrapolate patterns in order to apply that information to new solutions and actions. In supervised learning, certain parameters must be set up at the beginning of the machine learning process so that the system is able to find, assess, and act upon new data. As such, the system's supervised learning algorithms act as classifiers, labeling newly-arrived pieces of information according to some pre-defined criteria by a human domain expert. In contrast, unsupervised learning uses clustering algorithms to group similar data into often randomly-labeled bins, allowing the data scientists to identify and organize the data.

Aspect of the invention also comprise, and implement, deep learning (DL). One embodiment of the invention and system is an in-game advisor which is a machine-implemented advisor which has DL and natural language processing capabilities, thus allowing it to learn and interact with players as though the advisor were a real person. The in-game advisor assists users with general cyber knowledge as well as specific information on how to accomplish each mission.

In one embodiment, the method and system implement a Cyber Range. The Cyber Range comprises a virtualized game environment used for each mission scenario. In a preferred embodiment, the Cyber Range is a collection of virtualized and/or physical computers, infrastructure (e.g., firewalls, routers), services (e.g., DNS, e-mail, file sharing, mission specific), synthetic users and traffic that represent a real-world system, such as a business, military agency or base with sufficient detail to support cyber training, test or evaluation.

Figure 4:
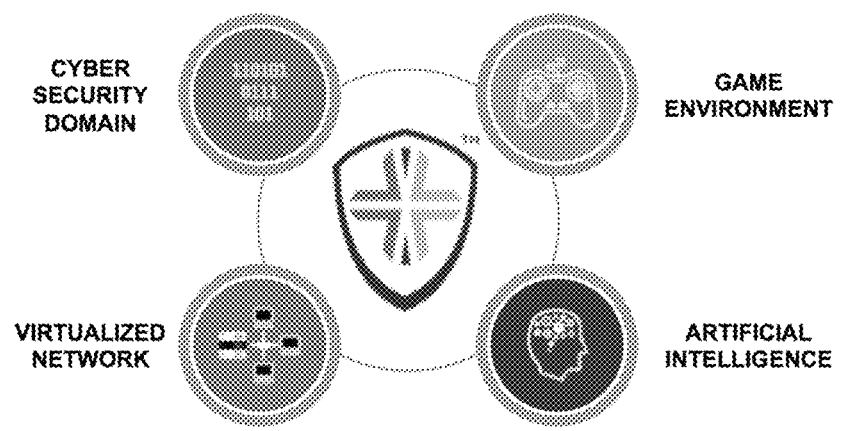
FIG. 4 provides an overview of features of one embodiment of a system of the invention.

In one embodiment, the system also includes a virtual Battle Room, providing the user with an environment separate from the system's mission environment where players are able to practice or train on specific areas General System Architecture and Methodology FIG. 4 is a high-level overview of a system of the present invention. The system may include a game environment, cyber security domain, an artificial intelligence (AI) components, and a virtualized network.

The system is designed to implement a cyber game environment that strives to incorporate a breadth of features that make it interesting and engaging for the player's training in cyber security and related topics. Features of the invention may include one or more of:

Problem solving: mission objectives (e.g. protect system X; save the world);

Exploring/questions: content unlocking and learning information about tools;

Triumphing (Points, Badges, Trophies)—and may further include a progression bar of completion and define a ranking of the user, such as in comparison to other users or to skill levels;

Role Playing: establishes specific roles for the team members and may further include putting team members into different roles/situations;

Customizing: enables the player to upload a customized toolkit for use during a mission scenario;

Recognition and rewards: achieving a specific status level through performance or time played to go from Apprentice, Journeyman, Master, etc.

Surprise: chance/randomness events during game play, dynamic change of opponent;

Imagination: creating defense plan to improve security and awarded players game points for effectiveness, creativity, and game play results;

Teamwork/Sharing: gifting and cooperation, inviting people to play, sharing tools/ideas/strategies; and Collecting: earn/buy tools, hints, badges for skills, game play achievements, and successes.

Figure 5:
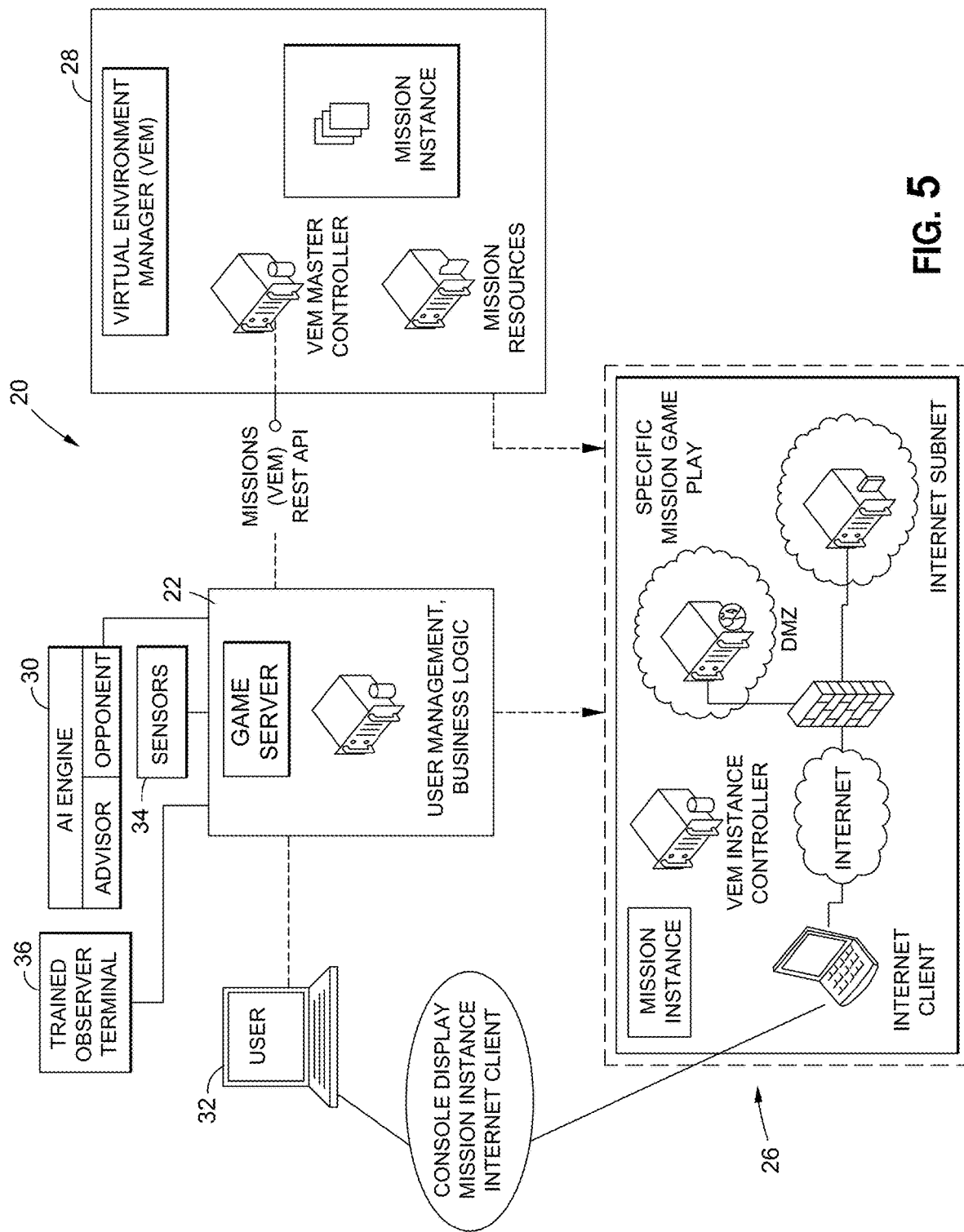
FIG. 5 illustrates one embodiment of a configuration of a training system in accordance with the present invention.

One embodiment of a system architecture in accordance with the present invention is illustrated in FIG. 5. The system 20 may include a game server 22, a virtual environment manager (VEM) 28, an artificial intelligence (AI) engine 30, one or more user or player or student stations 32, various game sensors 34, and one or more observer or trainer stations/interfaces 36. As detailed below, the VEM 28 cooperates with the game server 22 to create a virtual implemented mission instance or environment 26 having associated resources.

The player or student station 32 may comprise a computing station or terminal. Preferably, the player station 32 comprises a processor, at least one memory device for storing data such as machine-readable code ("software"), at least one video display device, one or more user input devices (such as a keyboard, mouse, joystick, touchscreen, VR/AR headset, etc.), and at least one communication interface (wireless or wireless) which facilitates communications other components of the system. The player station 32 might comprise, for example, a desktop computer, laptop computer or the like. The player station 32 might be configured as a thin or thick client relative to the game server 22.

The game server 22 may comprise a computing device which is configured with at least one processor, at least one memory device for storing data such as software and at least one communication interface which facilitates communications with other components of the system. In the preferred embodiment of the system, the game server is preferably implemented as a secure web application for managing the game-like portions of missions: user profiles and sessions, mission progress, scoring, training record, etc. See FIG. 6. As used in FIG. 6, the term "Guacamole" refers to a clientless remote desktop gateway and "Ravello" refers to a specific virtual machine supporting software implementation.

The game server 22 preferably receives data or input from other devices, such as the player station 32 and the VEM 28, and generates various data for output to other devices, such as the player station 32 and the VEM 28. In one embodiment, the game server 22 handles user management and authentication (such as player authentication), playback history, scoring and leaderboards and acts a mission information interface between the player and the VEM 28 (and its associated back-end services).

During the user login process of the preferred embodiment of the system, a user chooses to login as a player or trainer. An APISession object is created to associate the user's authentication token with the user's chosen role and a session object created by a web framework tool (such as the high-level Python Web framework tool known as Django). The created session object is used to determine the set of permissions applicable to various API endpoints. Session object and the user's chosen role, which is later used when determining the set of permissions to apply to various API endpoints. The session object is used to track a student's login (e.g. the start of a session) and the activities which the player engages in thereafter.

For the purposes of the game server 22, the system defines a trainer to be a superset of a player in that the role of trainer has all of the same permissions as that of a player, in addition to having more functionality such as creating comments, joining mission sessions without an invitation, etc.

The VEM 28 is preferably implemented as software on a computing device, such as a computing server (for example, both the game server 22 and VEM 28 (as well as the AI engine described below) might be implemented as software on the same computing device/server). This server may be the same or different than the game server 22. The VEM 28 preferably comprises or implements a virtualization management platform that the game server utilizes to create, monitor, and destroy mission related virtual environments. The VEM 28 utilizes underlying orchestration services to perform the active mission management. The VEM 28 provides interfaces to allow the game server 22 to interface to missions, including feedback on player performance and mission control. The VEM 28 interfaces to one or more mission content/configuration databases that it utilizes to create appropriate content based on player selection via the game server 22.

In one embodiment, the VEM 28 implements various control and agent mechanisms to create the necessary training scenario, including the training environment. In one embodiment, these control and agent mechanisms may comprise, as in the example illustrated in FIG. 19 and described in more detail below, an Mission Orchestration Service implemented via a Mission Orchestration Master, a Mission Orchestration Agent, a Log Server and one or more Collector or Log Agents.

In general, the Mission Orchestration Service is a subsystem of the system 20 which takes a mission design template and creates a virtual environment (Cyber Range).

The Mission Orchestration Master is a master which hosts all software and configuration parameters for the Mission Orchestration Agents within the environment, including network and service configurations.

The Mission Orchestration Agent is an agent service (e.g. a specialized software component developed to handle necessary requests and responses to configured and monitor each system dynamically) that runs on all machines within the mission environment and the controller interfaces with these agents to configure local networking and services. It installs packages, copies files from the master and allows arbitrary commands to be run from the master service. It also provides an in-game interface to monitor user progress, enable AI based opponent responses, and verify system health.

The Log Server, such as NxLog (which runs on the game/mission nodes), receives agent logs over TCP, adds tags including the originating IP of the log and stores them out to a single text file. These logs may be forwarded to a separate machine, stored in a database, and/or offloaded to the VEM for more permanent storage.

The Collector or Log Agents run on all other machines within the environment and forward logs to the server over the management network. Currently the agents listen to the /dev/log (syslog) and tail the mission agent's log file. Nxlog is also able to support windows event logs and secure transmission of log files.

The AI engine 30 also preferably comprises software running on a computing platform, such as a computing server. The AI engine 30 preferably interfaces with the game server 22, whereby the AI engine 30 obtains data or information regarding missions which are being implemented by the game server 22. This data may comprise, for example, information about a particular student inputs or actions during the game, game status and a wide variety of other information. In one embodiment, the AI engine 30 implements an AI in-game or in-mission advisor. This advisor receives messages or inquiries from a student via the player station 32. The AI in-game advisor preferably uses natural language recognition to process the inquiries and provide responses. Most preferably, the AI in-game advisor has a machine learning component, e.g. it modifies its configuration based upon past messages and responses to create a new configuration. The AI engine 30 also implements an AI opponent. The AI opponent preferably provides actions/responses to the game engine 22 for use in implementing a mission against a student. The AI opponent preferably also has a learning component which allows the AI opponent to change actions and responses over time, such as based upon student actions.

AI Elements of the System

The preferred embodiment of the system includes an Artificial Intelligence (AI) core element or engine 30 to provide an adaptive, deep learning, neural network to provide dynamic training missions targeted for specific users and groups of users with the ability to learn automatically in order to provide unique future missions targeted to a specific user or group of users.

The preferred embodiment of the system integrates Natural Language Processing (NLP), machine learning, and deep-learning artificial intelligence into its core. The operation of each possible physical and/or virtual device within the set of all possible devices that may be defined within a configuration are made known to the AI engine 30. For each system configuration associated with any given mission, all relevant data including cause and effect assessment data is collected and stored. The AI engine 30 utilizes the system's automated scoring, vast network of sensor data, success verses failure history, and other important data or events associated with each and every mission to adapt its internal algorithms and learn which user actions ultimately lead to success verses those user actions ultimately leading to failure.

As more and more users are tasked with specific missions using a plurality of system configurations, the AI engine 30 learns from each relevant user interaction that occurs during a mission and learns which sequences of events are the most optimal in order to achieve a associated with a mission goal. While there may be a theoretical infinite number of possible scenarios within a mission, the AI engine 30 uses all the data the system has collected and mined to determine the probability of success or failure at any given moment within the mission based upon user actions. This basic ability for the AI engine 30 to know how a user is doing within their mission at any given moment enables the disclosed training system to optimize the training experience and success of its users.

NLP and AI are preferably used for system's in-game advisor, incorporating machine learning algorithms to overcome the limitations presented by legacy systems.

NLP enables the in-game advisor to achieve human-like comprehension of text/language used by the students. The system learns through the interaction with users and mission scenarios over time, thus enabling the system to draw inferences from, summarizes, translates, and generates accurate and natural human language associated with student interactions using the system.

The AI opponent feature uses machine learning and modeling to generate responses and weigh up evidence to add more complex mission scenarios to its internal AI neural network over time. Deep learning AI technology, rather than slow, manual operator interaction, pre-defined rule-based structures and preprogrammed virtual entities, enables the disclosed system to utilize interactions with students and mission operation interactions to provide additional unique mission training experiences and scenarios for individual students and groups of students. The AI capabilities rely on sensor inputs from the system environment.

An essential element of the disclosed AI engine 30 includes: 1) an AI in-game Advisor to help players, 2) an AI opponent for challenging play, and 3) an Umpire to automatically score players.

The AI Advisor may: 1) Provide on-demand help and instant feedback; 2) Proactively help struggling players with audio and chat injects; 3) uses or incorporate DL or other AI algorithms, such as IBM Watson; 4) Train on Cybersecurity Offense/Defense and specific Mission Objectives; and/or 5) be configured so that player questions continue to add to AI engine knowledge base.

The AI Opponent may: 1) create dynamic adversary response to player actions; 2) be trained to perform as a human, relying on sensing inputs from cyber tools; and/or 3) provide varying level of difficulty to challenge players The Umpire may: 1) determine player scores based on objective measures; 2) permit the recording and replay of the game, such as at the end of game for full unveiling; and/or 3) dramatically reduce instructor work load in verifying player actions. The Umpire may include or be implemented via an AI component or comprise tools which sense and register player actions.

Figure 7:
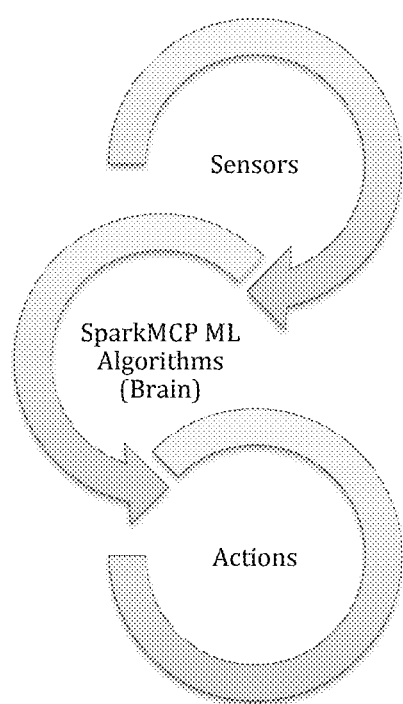
FIG. 7 illustrates aspects of an AI component of a system of the invention.

The AI opponent may play the role of the defender within a specific mission and automatically take actions based on the difficulty setting of the mission being played. The AI opponent adds depth to the game by varying responses that should increase the players' interest and mission replayability. The decisions made by the AI opponent are not predetermined, but are preferably based on ML algorithms that use a set of sensors (detection functions associated with the virtual training environment) as inputs and "actions", or response functions that the AI engine 30 can invoke as a consequence of a decision process, as illustrated in FIG. 7.

Referring again to FIG. 5, the sensor(s) 34 may comprise various devices or elements (real or virtual) which monitor aspects of the game/mission, such as by monitoring student inputs via the player station 32. The sensor(s) 34 may be associated with the game server 34 to obtain such information. The sensor(s) 34 may provide an output to, for example, the game server 34 or other devices. As noted, the sensor(s) 34 may comprise virtual devices or functions which are associated with the virtual training environment.

The preferred embodiment of the system integrates tools for mission infrastructure management and gameplay execution built on a dynamic communication bus. In the preferred embodiment, the system utilizes a tool known as Saltstack, also referred to as the SALT or SALT framework, to configure reproducible game play, training and mission environments onto which the invention's system applications are deployed. The sensor capabilities use the system's SALT framework and reside within the dynamically provisioned cyber range virtual machine instances. The actions are further implementable as SALT services, and reside in the same location. Sensor signals are communicated to the decision making AI engine 30, residing on a server or co-resident with the game server 22. Sensor readings are extracted via AI driven checks—since the AI engine 30 is not always paying attention to everything, and since it may not choose to pay attention to different systems at the same time, or on a deterministic schedule, sensor information extraction will be achieved via a request originating from the SALT Master Control Process ("MCP") to the master virtual machine ("VM") within the provisioned cyber range.

The system architecture preferably enables: 1) Adaptive hardening in terms of learning from and reacting to the players' tactics, techniques and procedures (TTPs) to make the gameplay more challenging; 2) Relative player tracking and ranking in terms of keeping track of each user's progress, and providing a comprehensive scoring for each user individually, as well as collectively; 3) Performance speed in terms of fluid menu navigation, short click response delays, rapid query results, and fast transaction processing; 4) Generation and storage of accurate transaction records including: (I) Player TTPs and scores; (II) Mission performance; and (III) Gameplay transaction logs; 5) Information assurance and security to minimize the risks of malicious attacks (i.e., spoofing, data exfiltration, data manipulation), loss of sensitive transaction data, and vulnerability to malware and/or 6) the ability to export various logs and reports for storage, import into other systems and printing.

The system 20 preferably comprises one or more observer or trainer interfaces 36. These interfaces 36 allow the trainer to effectively observe a student's game play or mirror the player stations 32 and interact with the student as either an offensive or defensive opponent. Each trainer interface 36 communicates with the player station to provide a real time view of the player's activity. The interfaces 36 comprise an interface to the game server 22 and VEM 28, whereby information regarding the game play can be mirrored or provided to the observer in real time and the observer can interact with the system 22. The interface may be facilitated by a terminal or station at which the observer may view (such as via a video display) the game play and provide inputs (such as via input devices such as a keyboard, etc.).

System Player Interface

As described above, in the preferred embodiment, the system enables or includes a user interface which implements a preparation/mission proficiency phase, then a mission play/execution phase, and then an assessment phase.

Figure 8:
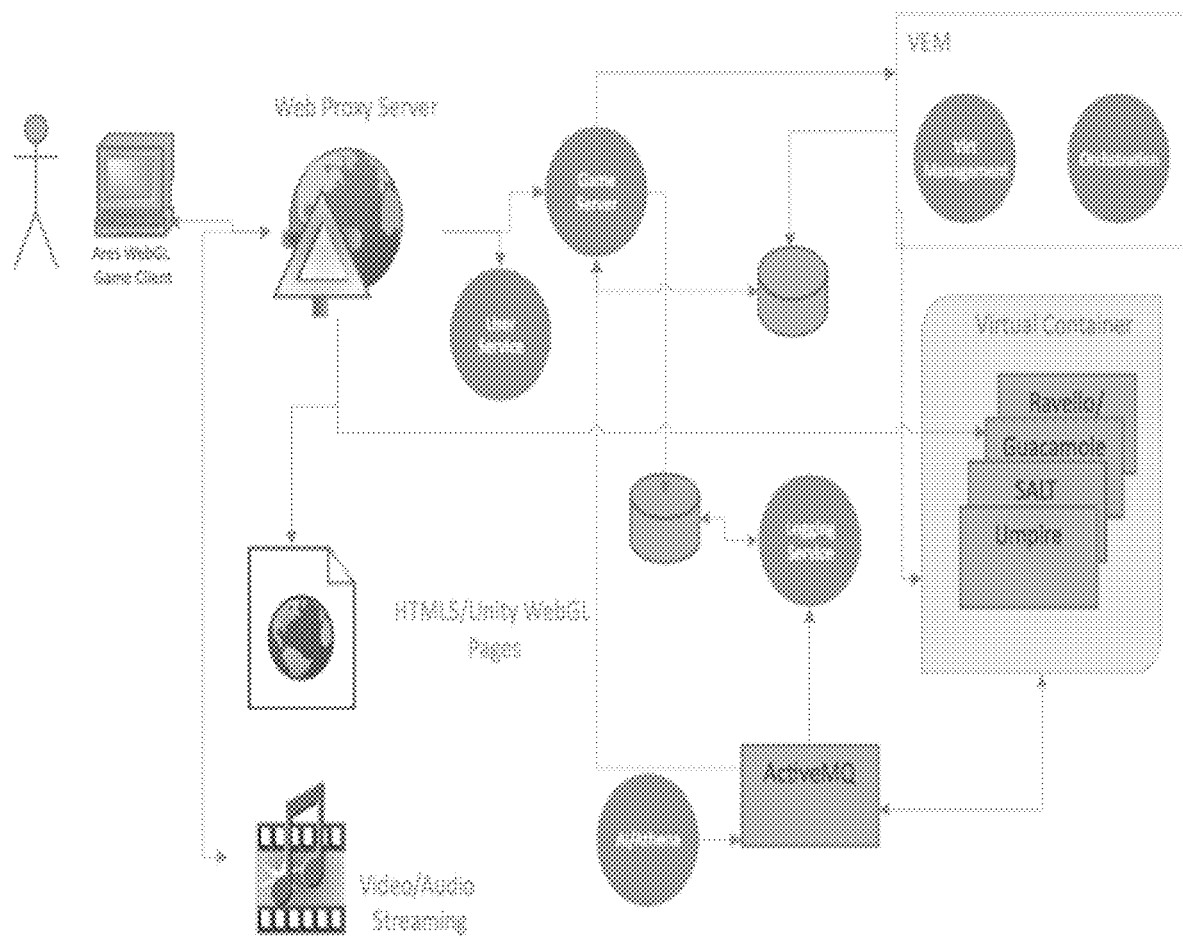
FIG. 8 illustrates additional features of a system of the invention.
Figure 9:
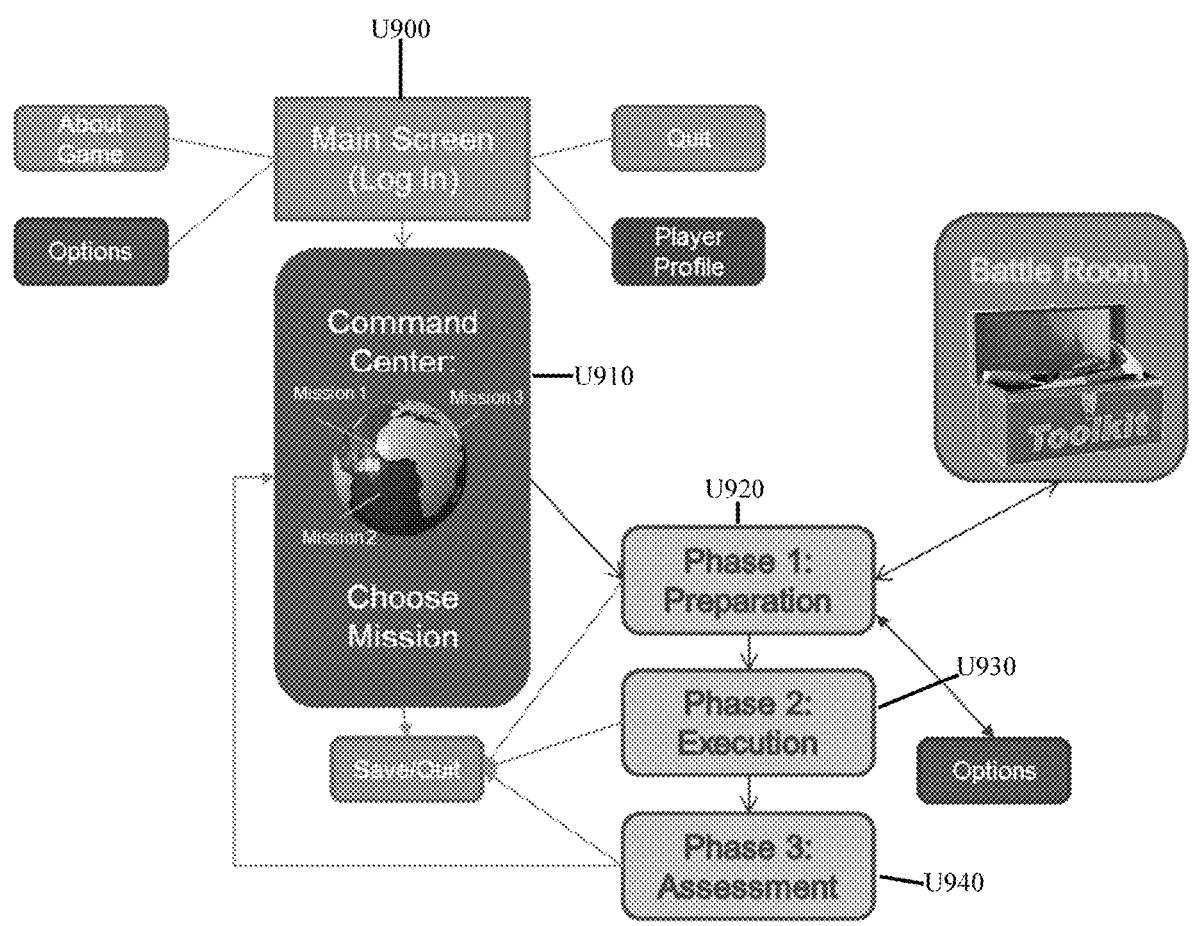
FIG. 9 a system interface and mission phase processes.

FIGS. 8 and 9 depict one embodiment of a system UI. FIG. 8 depicts how the UI from the perspective of a game player integrates within the larger ecosystem of the overall game system. FIG. 9 depicts a Main Screen Login U900 scene and the start state of the UI U910. Once the game player selects the mission, the three phases of the training scenario occur. Phase I U920 is the game scenario preparation phase. Once preparation is complete, phase II U930 execution occurs, wherein the player plays the selected game scenario. Finally, phase III is the assessment phase U940, wherein the player's game play is assessed and recorded.

As described above, FIG. 5 system 20 includes a number of databases, such as databases of virtual resources (tools, network components, etc.) which may be used in forming training scenarios. Different scenarios may be created from a set of virtual resources and/or other scenarios may be create by changing the sets of virtual resources. Likewise, different missions may be created from the various scenarios. As noted herein, the virtual resources may be used with or coupled with physical devices to form the training environment (for example, a training environment might include a virtual environment as well as a physical router device which is addressed into the system/environment, or other physical devices such as servers, computers, hubs, switches, bridges, modems, access points, repeaters, gateways, firewalls, multiplexers, adapters, data storage devices, etc.).

System Mission Preparation Process

In a preferred embodiment of the system and method, all users must first prepare for a mission in a similar way in which a user would prepare for a cyber threat in the real world. In one embodiment of the system preparation is defined as a user watching a system video associated with a specific mission wherein the video includes a unique, compelling mission backstory and list of mission objectives. The videos may be stored in one or more databases which are accessible as mission assets by the game server 22.

In the preferred embodiment, the system video further includes a broader set of information to include one or more of the following: 1) video of mission backstory to play/replay and/or text of backstory; 2) mission order (objectives, tools, rules of engagement, intel), wherein the missing order may contain 5 sections: a) situation (events, recent attacks, general network info, adversaries of interest, cyber threat to expect), b) mission (e.g., detect and mitigate), c) execution (e.g., steps/products required, coordination instructions), e) service and support (e.g., what are you provided with and where do you enter), and e) command and control (e.g., chain of command, means of communication); 3) rules of engagement (ROE) tell you where you are placed in the network, what you can and cannot do without permission (e.g., scanning can only originate from this host, permission is required to push any group policy objects); 4) intel about likely threat actors and their indicators of compromise (IOC) that might be encountered; 5) team set-up which may be single player, invite players and may include selecting roles for teammates and method of communication (chat rooms, wiki, Redmine tasks); 6) skills required for the mission (that will be earned during mission play); 7) casual cyber games to play (such as, but not limited to kill chain cylitaire, ports/protocols, cyber jeopardy/trivia, cyber vault—e.g. exercises which may be used for practice or could lead to earning points or prizes that help them (e.g., maybe they earn a password cracker tool or a hint for the mission); 7) tools requested (categories of tools, information/videos, play in battle room); 8) quizzes to take to verify mission understanding and/or tool qualifications (these may be analytical quests rather than short, multiple choice, flash card-like quizzes); 8) verify environment (network interfaces, host IP, OS, name, services/key ports) where the user is put on the actual mission range and performs recon to identify/verify that the environment is what is depicted on a diagram shown; 10) identify the cyber key terrain and mission impact model.

In other embodiments, the user may interact with both a network owner and mission owner as non-player characters.

Mission Execution Phase Process

The mission execution phase is the portion where the user(s) is on a mission. In one embodiment, the mission or mission elements are timed (or may have time limits, such as defined during the mission preparation phase), wherein a clock or timer keeps track of time for each objective or the mission as a whole (in one embodiment, a player may pause/resume missions so long as the mission is completed in the total time duration).

The mission execution phase of the system may include one or more of: 1) a range for the mission (virtualized network with IT systems, mission systems, key terrain); 2) objectives to be performed; 3) The in-game AI advisor to support user or inject information to the user; 4) ability to upload new tools (download must be restricted due to International Traffic in Arms Regulations)—users will need to request download in the future; and/or 5) other potential features (such as change log, mission/reporting log, request for change (to network owner), request for information (to mission owner, network owner, intel agencies)).

Figure 10:
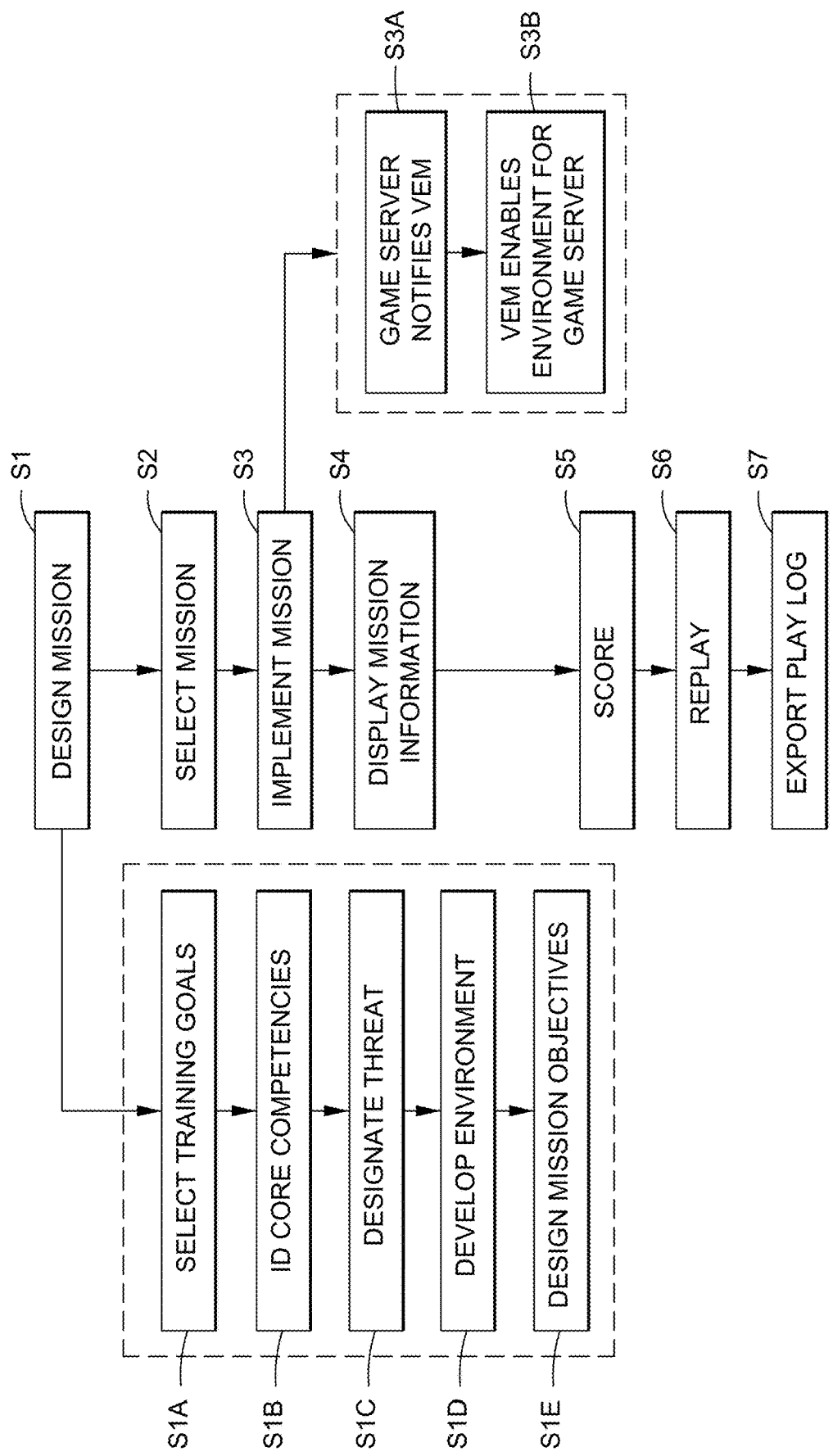
FIG. 10 illustrates a flow diagram of various methods in accordance with the present invention.

One embodiment of a training method will be described with reference to FIG. 10. As illustrated therein in a step S1, a mission is designed or developed. This may be performed, for example, by a trainer or operator of the system 20 using one of the trainer interfaces 36 to interface with the VEM 28, such as via a mission editor interface (such as software running on the VEM 28) to develop a mission from the available mission resources (tools, environment components, etc., as detailed above).

In one embodiment, the development of the mission may comprise multiple steps. As illustrated, in a step S1A, the mission designer may select various training goals. In a step S1B, the mission designer may designate or identify various core competencies. These competencies may designate the minimum level of competency required of a player to complete the mission and thus may determine the complexity of the mission. In a step S1C, the mission designer designates a threat or threat actor for defensive missions or a set of targets with known vulnerabilities for offensive missions. In a step S1D, the mission designer uses the mission editor to develop the mission environment. This may comprise the mission designer selecting from the various tools, network devices and the like which are available from the mission resource database. Mission definition can leverage large portions of existing missions when applicable. In a step S1E, the mission designer selects mission objectives. From the selected or provide information or criteria, a mission is designed. This mission may then be stored in the mission database associated with the VEM.

In a step S2, a player or trainer may select a mission from the mission database (for example, a player may select from a list of missions or a trainer may select a mission for player). In one embodiment, a mission may require a core set of competencies. Thus, a player may be required to test or qualify to the designated level of core competencies in order to be entitled to play a designated mission. In one embodiment, for example, a player may be required to take a short test which is implemented via the player station in order to test the player's level of core competency. In another embodiment, the player's level may be stored in a player file and be checked against the minimum core competency level for a particular mission. In this regard, in a preferred embodiment, a player has an associated player profile (such as stored in a database at or associated with the game server). Each player profile includes attribute information including user background, background correlated to expertise, age, gender, education, cyber skills or certifications, current job or MOS/rating if military. Additionally, each player profile includes user information associated with the player's specific knowledge, skills and abilities gained in training, awards, badges, and trophies. The system further supports the addition of attributes deemed unique to the player and/or mission stored within the player profile.

The player preferably logs into the system to identify themselves and associate their player file with their activities. As noted herein, information associated with the player's activities, such as a mission score, are preferably stored in association with an identity of the player.

In a step S3, assuming any designated criteria are met, the selected mission is implemented. In one embodiment, this comprises the game server receiving input from a player or trainer regarding a selected mission and, in a step S3A, the game server notifying the VEM of the selection. In a step S3B, the VEM then enables the mission environment for the game server, using information regarding the mission which is stored in the associated mission database and data regarding the various selected mission resources which are stored in the mission resources database.

In one embodiment, as detailed herein, variability is introduced into the mission. In particular, in order to prevent each mission from being the same (thus allowing students to memorize problems and associated solutions and limiting the scope of training), variability as to various mission elements is preferably introduced. This variability allows, for example, a particular base mission template to be used to create any number of different particular missions. As one example, a particular mission template may define a mission environment, but mission variability may be introduced to change the particular devices (such as virtual machines), operating systems, tools and the like which are associated with the mission environment.

In one embodiment, each mission consists of a blueprint of virtual interconnected systems, tools, networks and devices. The VEM deploys the base mission blueprint on virtualized backend hardware infrastructure and ensures that the virtual systems are successfully started and interconnected. Each running mission environment is set up so that it is completely isolated from other concurrently running missions in use by other players.

Each blueprint contains a range of parameters that allows for randomization of the parameters at the start of each play. At the time of mission instantiation, several variables are chosen to determine the characteristics of the mission/game and then the VEM creates a specific mission instance. This allows for variability to a player in repeated attempts of the same mission.

The implementation of the mission also depends upon the configuration of the mission. For example, as indicated herein, two players may play against one another in offensive and defensive roles. This requires that the game server interact with a first offensive player at a first player station and a second defensive player at second player station. In other embodiments, multiple players may be in a similar fashion. As also indicated herein, a player may play against an AI opponent. In this configuration, the AI opponent of the AI engine 30 is enabled relative to the particular mission.

Once the mission is enabled, in a step S4 information regarding the mission environment is displayed to the player(s) and the players begin providing inputs. Again, in the case of play against an AI opponent, the AI engine 30 receives information from the game server regarding the mission and the player's actions and then responds accordingly.

Preferably, as detailed below, the player's actions are scored, as in a step S5. Preferably, the player receives points or scores for actions, rather than just a rating or score for completing a mission. In this manner, the player's competency across a multitude of actions may be evaluated.

During play, mission activities, such as player actions and responses, are tracked/logged, to be part of the replay during the assessment phase. As indicated herein, this information may be stored in one or more mission logs.

In a step S6, once the mission is completed, the player may replay the mission from the stored mission play logs. This allows the player to review their actions and consider mistakes and record lessons learned.

In a step S7, the play log for the mission may also be exported, such as for further review and analysis or to be reviewed at a later time—e.g. in an "assessment" phase as detailed below. For example, a player may play a mission and a trainer may later export the mission log for that mission and review the player's actions as part of determining additional training for the player or the like.

Assessment Phase Narrative Process

As noted herein, game play information is logged or stored. This log data may comprise, for example, system logs, player chats, umpire checks and system advisor exchanges. The game server 22 provides access to the log data (where that log data is correlated to the player and the particular mission) for presentation in an assessment scene.

The assessment phase process of the preferred system begins with the user being presented the assessment scene via the User Interface. The assessment scene may comprise a depiction of the network used in the mission play (with complete ground truth data), a list of mission objectives, a VCR style set of control buttons and a time slider. The VCR control and time slider are used to replay the relevant mission events. Relevant events include: initial adversary starting conditions (e.g., location of malware or botnet), user actions and umpire scoring.

Each relevant mission event is depicted on the assessment scene at the applicable time, using a combination of: highlights, thought bubbles, image tinting, icon expansion/contraction, and/or color changes.

The actual type of depiction presented by the disclosed system is based on the type of event. For example, when a user logs on to a machine, the machine highlights with a color/tint change of displayed information and a thought bubble that pop up to show the user logon.

The tint change and thought bubble soon fades as the next event occurs. If the network is being scanned, then the machines being scanned will expand slightly. If a resource is being denied, then it changes color to a color such as red.

Figure 11:
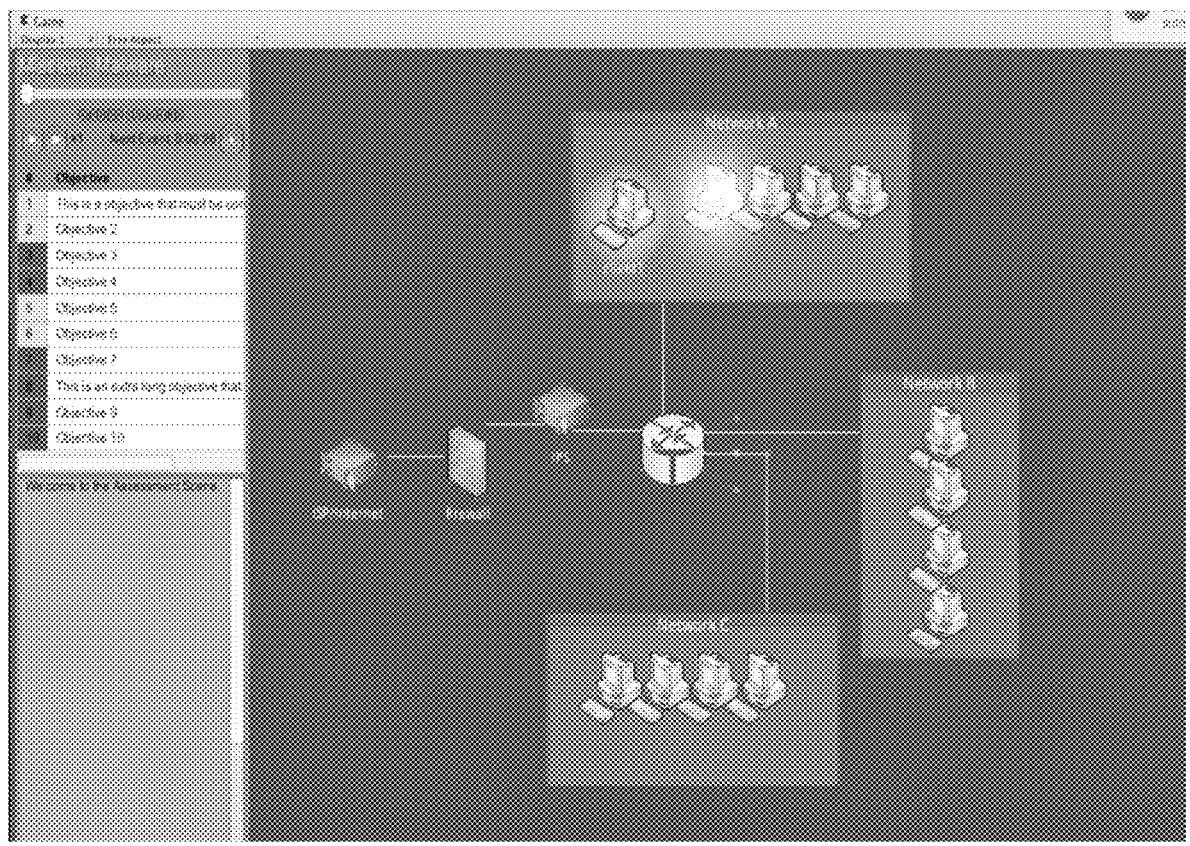
FIG. 11 illustrates aspects of a user interface of a system of the invention.

A combination of highlights are used to depict several actions on a single network object at the same time. An example of a depiction is shown in FIG. 11.

The user is provided the ability to click on a network object in the depiction and replay relevant events for that network object. When the system is in this mode, the VCR style control is not active. Instead the user is presented with a scrolling list of events about the network object in question.

As the replay unfolds the mission objective(s) text changes color to reflect the state of the objectives. Initially all of the mission objective(s) text is in the same color such as yellow. Once a mission objective has been achieved, its corresponding text changes to a color such as green. If a mission objective has been denied then the corresponding text turns to a color such as red.

An overall mission score/grade is presented to the user from the preferred embodiment of the system. In one embodiment of the system, this score/grade is the total time and time for each objective. However, such a metric isn't generally the preferred metric as cyber defense encourages a defender to spend time watching and observing the adversary in order to gather intelligence on the full scope of methods used by the adversary and the associated data to related to attribution.

In the preferred embodiment of the system, after the mission replay and results processes are completed, the user(s) is prompted with a text box region for them to record their lessons learned about this mission. Generally, this is in the form of the following data: areas to sustain, areas to improve. This data is stored by the system in the mission record such that a report is created by the system, comprising: the Mission Essential Tasks (METs) achieved or skills demonstrated, mission objectives/results, and lessons learned by the system user.

Additionally, mission play points are earned for the game by the user, badges earned by the user for skills demonstrated by the user, and the user's trophies (leaderboard ranking). All of this data is displayed by the system and recorded in the user's mission record.

The system provides each user with the ability to store off their mission results to a local machine for recording and replay at a future time by the user.

Mission Execution

One embodiment of operation of the system 20 includes: 1) defining scope of play; 2) defining environment; 3) selection of threat actor; and 4) mission elements.

1) Decide Scope of Play: This may comprise evaluating or selecting one or more of: User knowledge, skills, abilities (e.g. "KSAs")—Mission Tasks, conditions, standards, offense/defense tactics, and/or single or team training.

2) Define Environment: This may comprise evaluating or selecting one or more of: Mission domain (critical infrastructure, military, commercial); key terrain (business processes, systems emulated, user behavior and data); and/or enterprise IT (types of computers, O/S, services allowed, defense posture, cybersecurity tools and processes) and if ICS/SCADA is required 3) Select Threat Actor: This may comprise evaluating or selecting one or more of: emulated threat actor tactics, techniques, procedures (TTPs); adversary goals (confidentiality, integrity, availability); and/or scenario context and threat intelligence information.

4) Design Mission Elements: This may comprise evaluating or selecting one or more of: Network diagram and key terrain; user tasks, conditions, standards (umpire assessment checks); variability of game (environment, tools, events); artificial intelligence requirements (instructor support, opponent capability); and/or user artifacts (such as mission order, rules of engagement (ROE).

Additional Features

Battle Room System Feature

Another feature of the system includes the utilization of the system 20 which is illustrated in FIG. 5 to implement a Battle Room. As used herein, a Battle Room is an environment which is similar to the system's mission environment, but where players are able to practice or train on specific areas and well defined tasks. In the preferred embodiment of the system, the Battle Room serves two main goals: team free-play for a two-sided mission and system provided tool training similar to a virtual training laboratory.

The Battle Room is a place to prepare for missions provided by the system. In one embodiment, the Battle Room is filled with small virtual laboratories to assist a user with the development of system skills and to provide the user with a comfort level associated with system features and tools. Such skills and system tool knowledge enhances the user's overall learning experience in missions provided by the system.

The Battle Room is similar to a mission except that there is no mission preparation and no scenario context. Instead, the mission provides an environment for the student to perform a particular skill or task. As described herein, the student may be awarded points for completing a particular skill or task in the Battle Room.

Figure 12:
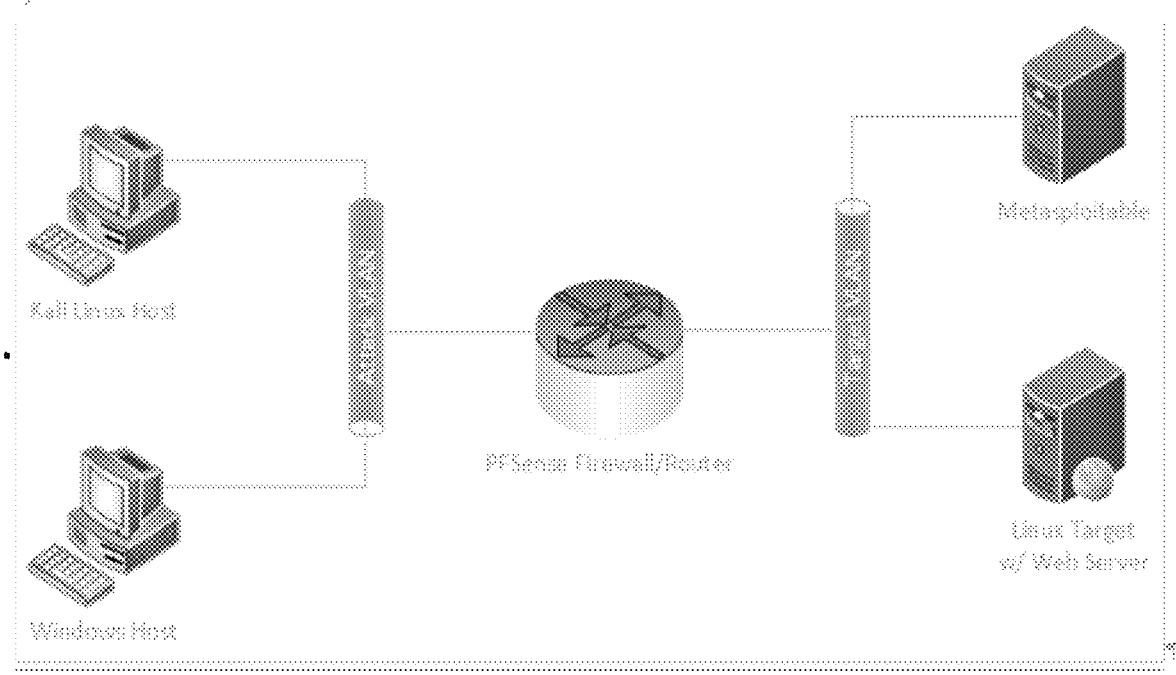
FIG. 12 diagrammatically illustrates a Battle Room feature of the invention.

A diagram for the Battle Room is shown in FIG. 12. In the preferred embodiment, a key feature of the virtual battle room is it is small enough to allow a mission associated range to spin up when the player starts the game, or quick enough to have a cache of 1 or 2 mission associated ranges running in the background at all times. Such background execution allows the system to quickly spin up a mission range.

Mission Development Kit

Figure 13:
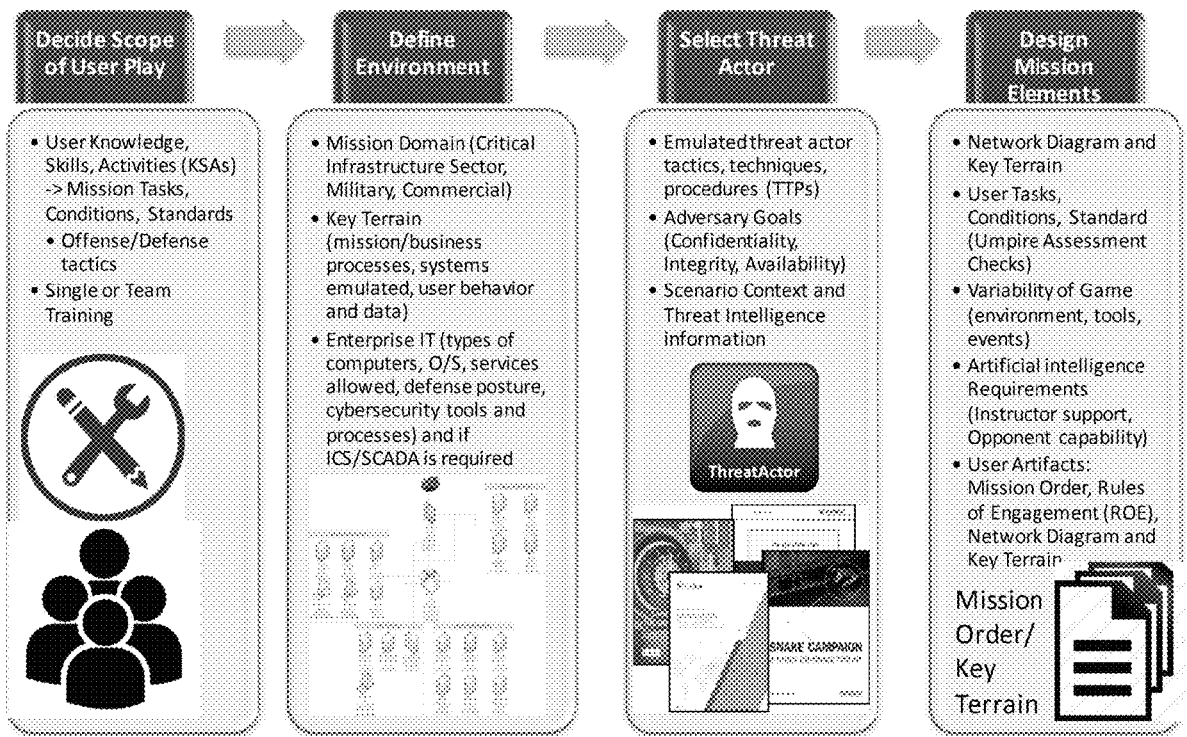
FIG. 13 illustrates aspects of mission execution of an embodiment of the invention.
Figure 14:
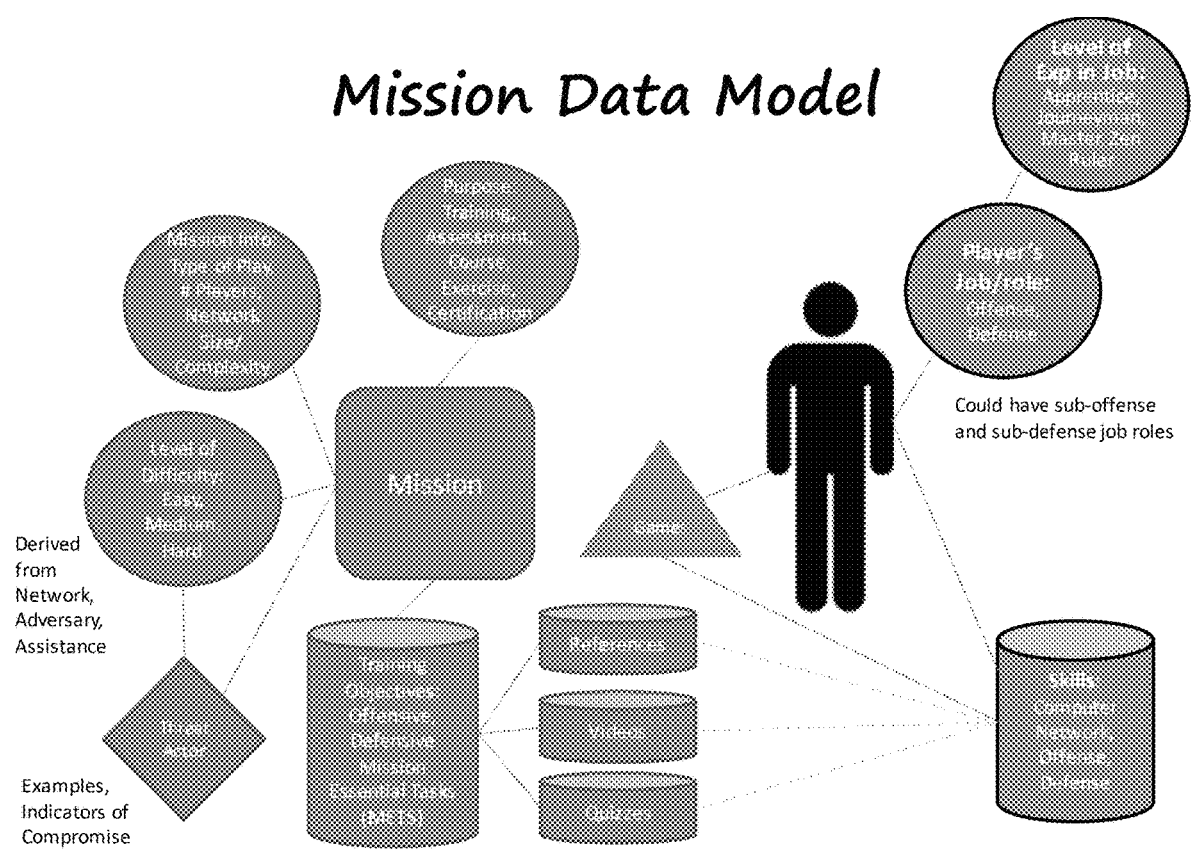
FIG. 14 illustrates a mission data model.

As illustrated in FIGS. 13 and 14, the preferred embodiment of the system includes an initial generic mission that others can use and an optional customized version that represents a higher fidelity of a user's specific organization. The preferred embodiment of the systems allows a collection of missions to be compiled into a mission development kit, thus enabling users to rapidly configure a preferred operation and mission provided by the system.

Game Server Chat

Within the preferred embodiment of the system 20 depicted in FIG. 5, a standalone chat room 51 feature or an integrated chat room 51 feature is integrated within the Battle School environment to enable users of the system to communicate with each other. Features of the system chat room include the following process flow:

Upon logging in, users are automatically added to the global chat room.

Users can send messages to the room.

Users can send direct messages to other users not in the same room.

Users in the same room can view all messages sent to the room.

Users can send direct messages to a single recipient in the same room.

Direct messages are only viewable by the sender or the recipient.

Upon joining a Mission Session, the user is automatically added to the Mission Session chat room and removed from the global chat room.

Upon leaving a Mission Session, the user is automatically added to the global chat room and removed from the Mission Session chat room.

Users can only be in one chat room at a time.

Messages are unformatted plain text.

Chat Room Operation

Once a user joins a chat room provided by the system, the user remains in that chat room until their associated APISession no longer exists or until the user manually exits the chat room. The 'last seen' field of the APISession may be utilized via the system to identify players whose APISession has not yet expired, but who are also probably not active. For example, the system UI may display these users on the UI with a status icon indicating the user might be away, paused, or unavailable.

Each Mission Session created by the system includes two accompanying chat rooms—one for players, and a private chat room for trainers. Upon joining a Mission Session, players automatically join the player chat room, whereas trainers automatically joins the trainer chat room and "subscribes" to one or more specific player chat room(s).

Chat rooms continue to exist until the last user has left the chat room, at which point the chat room is automatically archived by the Game Server.

Chat Room Subscriptions vs. Joining a Room

By subscribing to another chat room, a trainer can view messages in that chat room and receive WebSocket notifications about messages sent in that chat room without actually appearing as a user within the room itself. A trainer has the option of joining the player chat room, at which point the players will be able to see the trainer's presence; or a trainer can inject chat messages into the player chat room through the Athena Advisor API and appear to the players as "athena" without having to join.

Merging the Advisor and Chat APIs

Currently interactions with the system occur inside the chat user interface, but are outside the chat API. Messages that are sent to the system by a user are not seen by other users within the same session and vice versa. Additionally, the system returns an error code prior to the Mission Session being available.

Adversary Subsystem and Processes

The adversary subsystem is a series of processes, which run inside the system environment forming a virtual adversary environment (for example, the adversary system may be implemented as software/applications which links to the VEM 28. These processes are driven externally by a series of scripted events originating from the system's event subsystem. The event subsystem is a framework integrated within the system 20 illustrated in FIG. 5 for collecting, processing, storing, and querying events and logs within the mission environments. The event subsystem preferably comprises a capability built on top of the SALT master-agent, where the adversary thus receives information from the system sensors via the event subsystem. A set of tactics that events correspond to within the adversary subsystem are as follows:

Reconnaissance—Probing the target external network.

Delivery—Weaponized payload delivery and exploitation of the target network.

Persistence—Action creating persistent access to a system(s).

Privilege Escalation—Action obtaining a higher access level on a system.

Defense Evasion—Action avoiding detection by defensive services/actors.

Credential Access—Action obtaining or allowing access to target systems, domains, or services.

Discovery—Actions obtaining information about internal systems and networks.

Lateral Movement—Actions enabling or expanding access to additional target systems.

Execution—Actions enabling the execution of adversarial code on systems.

Collection—Actions gathering information on target systems.

Exfiltration—Actions removing information from the target network.

Command and Control—Actions establishing a communication channel to target systems. This tactic will always correspond with an additional tactic, such as Execution.

For each system tactic or event described above, a set of techniques are defined within the system, which describe the adversary's specific actions corresponding to the event. The specific set of techniques employed by the adversary are used by the system to emulate realistic threat groups.

The set of techniques define a configuration set for the adversary at mission start time by the system. The events are triggers, causing the adversary to take specific actions towards the targeted network. The following section describes the techniques available. If applicable, each technique includes optional arguments and resulting variables created after a successful application of the technique.

The AI system interacts with the adversary by automatically modifying its techniques and triggering a subset of the event. This enables the adversary to accomplish its goals while modifying its viewable behavior to the user to avoid evasion by the defense.

Modification to the techniques are applied to future actions, not backported. For example, if the AI changes the persistence mechanism from 'Registry Run Keys' to 'Scheduled Task', future persistence events will use a scheduled task. The same goes for ongoing tasks. Command & Control is an ongoing task so changes to it won't take immediate effect, only if the underlying task is reset.

The Events, which are made available to the AI, are Defensive Evasion, Execution, and Command & Control with the purpose of allowing the AI to change host artifacts and expand to additional hosts.

The Corresponding adversarial event list, would look like that illustrated in Table 1.

TABLE 1

| Step | Event | Corresponding Event | Time (min) | Target | Arguments |
|---|---|---|---|---|---|
| 0 | Delivery | Execution, Command & Control | 0 | | [wkst1, wkst2, wst3, wkst4, wkst5]. rahatalo.com |
| 1 | Privilege Escalation | | 5 | Target1 | SYSTEM |
| 2 | Persistence | | 10 | Target1 | SYSTEM |
| 3 | Discovery | | 15 | Target1 | 172.16.10.0/24 |
| 4 | Lateral Movement | | 20 | Target1 | target1.discover1 |
| 5 | Collection | | 21 | Target1 | target1.discover1 |
| 6 | Exfiltration | Execution | 25 | Target1 | target1.collection1 |

A description of this table follows:

The Event column corresponds to the events or tactics described above. The time column is a listing of when the events should occur according to time 0, the start of the mission. The target column is the target, which an event should occur over. The arguments column contains any information relevant to the tactic, i.e. for privilege escalation, what user we want to escalate to.

The 'target1, 'discover1', and 'collection1' can be best explained by walking through what occurs. In this particular instance, delivery opens a multi-staged infection resulting in a remote access Trojan (RAT) running on the targeted system, one of wkst1, wkst2, wkst3, wkst4, or wkst5.

Additionally, at this point the RAT would have injected into a running process on the system. The resulting communication between the RAT and adversary is named target1. Therefore anything that targets target1, targets the initially installed RAT. If there was an additional delivery to a second system, this would be referred to as target2.

Steps 1 and 2 in the table, are straightforward privilege escalation and persistence mechanism actions. Step 3 runs a simple TCP SYN scan against the local network specified in the arguments. Any systems detected are assigned variables discover1, discover2, etc. These variables are local to the target, but should be accessible by other targets. Step 4 is using Pass the Hash to impersonate the Administrator and mount Administrative Shares locally. Step 5 then stages the network share in a local compressed archive which can subsequently be referenced by collection1. Finally, step 6 exfiltrated this compressed archived over the C2 channel.

Figure 15:
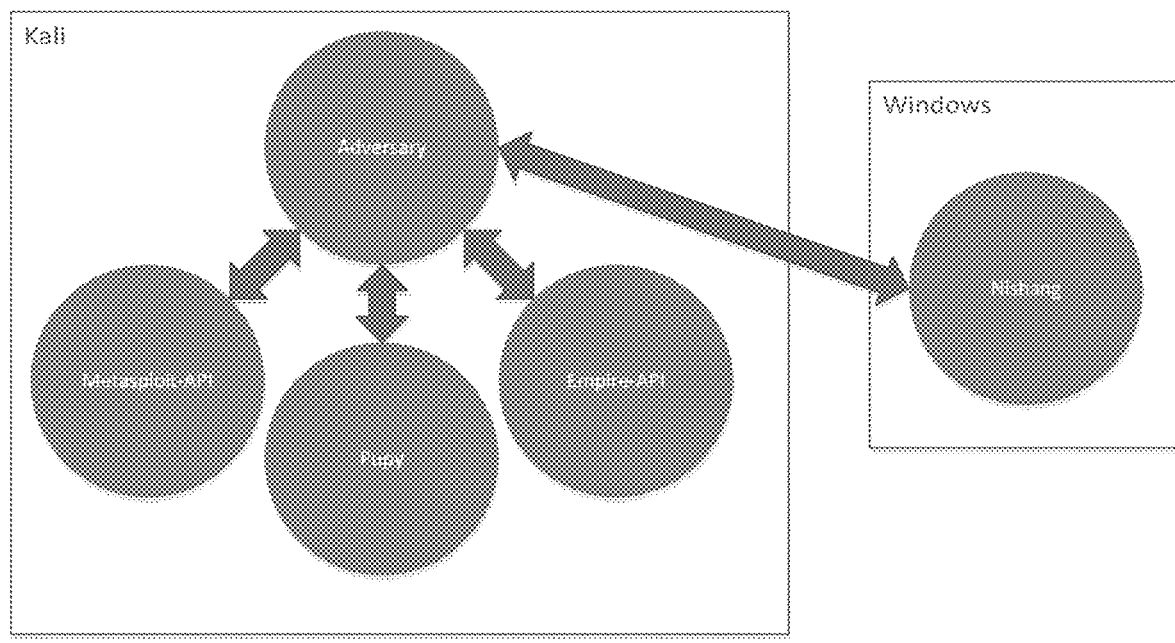
FIG. 15 illustrates AI adversarial tools in accordance with an embodiment of the invention.

The adversarial system is made up of multiple internal and external components including framework processes. For example, if the AI opponent is offensive, it will respond to the student's defensive actions using one or more offensive tools (the AI opponent uses a collection of appropriate tools that are installed on the Cyber Range and issues comments to the game server for things in the tool to occur). The AI tools might comprise, for example, network penetration tools such as a product from Rapid7 known as Metasploit and the open-source remote administration tool known as Pupy, and local and remote tools that generate payload executables to bypass common antivirus solutions such as Veil, and tools for offensive security such as nishang (on Windows). See FIG. 15.

The adversary acts as a management process exposing an endpoint for the event subsystem to communicate tactical events and techniques both scheduled and from the AI.

Figure 16:
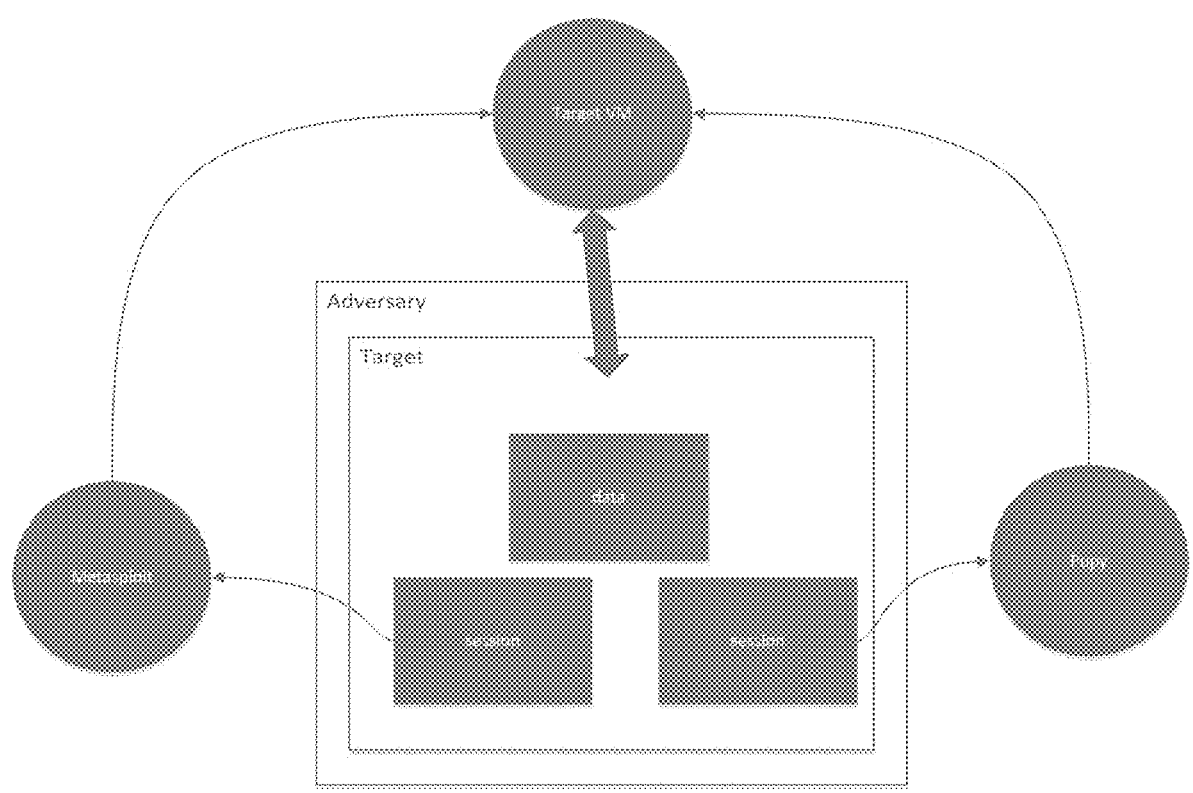
FIG. 16 illustrates aspects of an adversary subsystem.

The Adversary subsystem creates a data object 'Target' for each VM which is communicates with or infects. This is a logical connection while the actual command and control is performed by whatever framework is in use, i.e. Metasploit. This mapping is managed through a session object belonging to the target. A session corresponds directly to sessions within Metasploit and Pupy. Furthermore, a target can have multiple sessions. Information collected from the target VM is stored in the Target object so that it can be shared with other frameworks, and other targets. See FIG. 16.

Adversary Subsystem Interface

Tactics

The adversary process exposes a local API adhering to the principles of Representational State Transfer (REST), which does not require the client to know anything about the structure of the API. Rather, the server provides the information a client needs to interact with the service. A RESTful API is built around the tactics. Each tactic maintains the list of associated techniques as well as any tasks associated with the tactic. All tactics possess a common structure for adding, modifying and removing techniques as described below. Additionally, all tactics except Command and Control expose a method of creating and querying for tasks which either run in a local worker thread or a framework.

Events

The Event subsystem of the disclosed system is a framework for collecting, processing, storing, and querying events and logs within the mission environments. The system adds consistency to query for data topics originating from several sources within the environments.

Detailed System Design

Class Diagram

Figure 17:
FIG. 17 illustrates aspects of log databases of the invention.

Log Database—see FIG. 17.

Missions

The Missions table maps the readable mission name to an ID associated with the log entries Event The Event table stores processed messages which are directly correlated to events within the mission. The messages originate from the topics 'umpire.*', 'ai.*', and 'orchestrate.*'.

TABLE 2

| Name | Description | Type |
|---|---|---|
| Tag | Corresponds to the message topic | String |
| Time | The generation time of the message | Timestamp |
| target | The machine name where the message was generated | String |
| Name | The name of the message | |
| Message | The raw text of the log message | String |
| Remote | Any remote IP associated with this event | String |
| Message | Any additional information associated with this event | String |

Component Diagram

Figure 18:
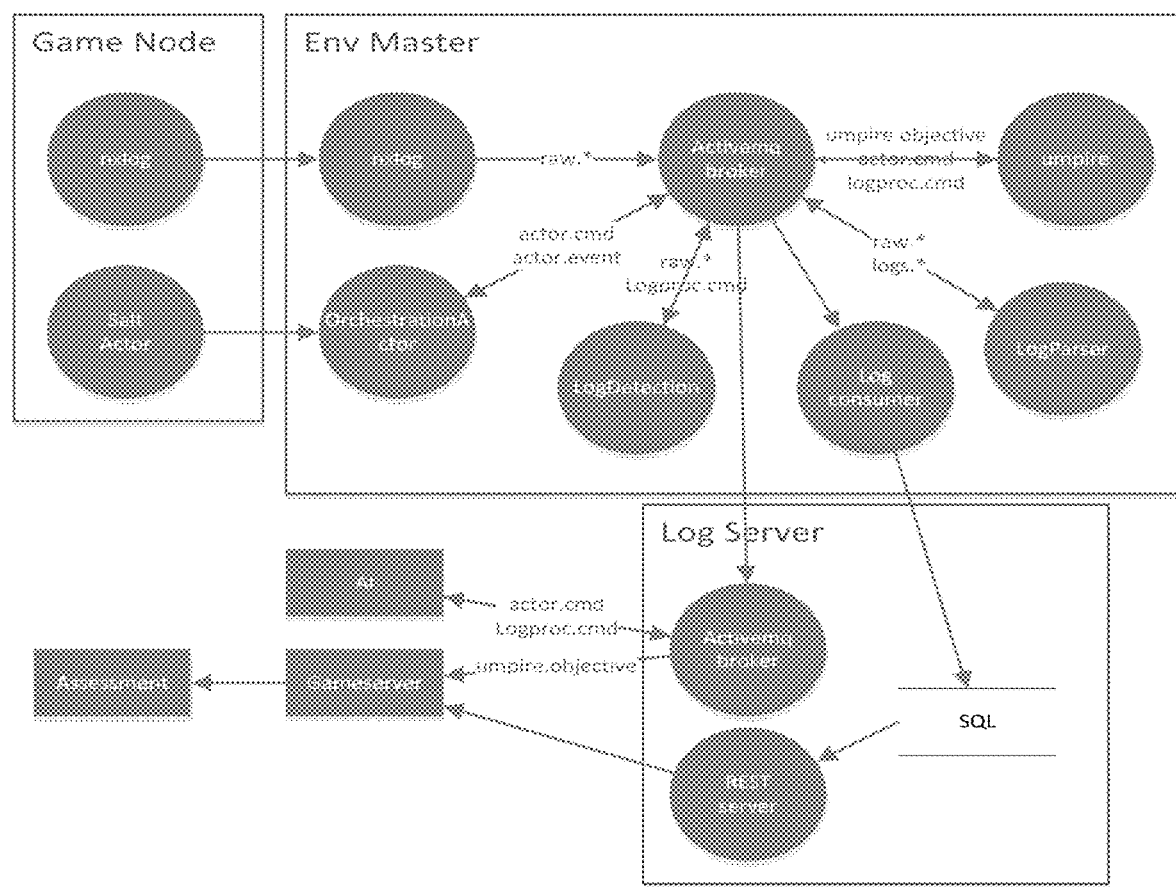
FIG. 18 illustrates aspects of an ENV master component of the invention.

Referring to FIG. 18, the component on the Env Master are broken into multiple processes each with a specific task. All communication between components is achieved over the local activemq broker using various topics and queues defined in the next section.

NXLog

An NXLog agent runs on each of the VMs within the environment collection system logs as well as any other level specific logs. The NxLog agent receives agent logs over TCP, adds tags including the originating IP of the log and stores them out to a single text file.

These are forwarded to a local NXLog agent on the Env Master which converts the messages into type raw topics on the activemq broker.

OrchestrationActor

The OrchestrationActor interacts with the salt-minions running on each of the nodes. This agent is responsible for running any umpire checks which utilize the salt infrastructure as well as running any events. When a check is executed and returns a result, the result is sent out on a queue to the reply_to field (i.e., sent back to the umpire), or on an actor.event topic. If the event is of type periodic, it is rescheduled, otherwise it is removed.

LogDetection

The LogDetection agent subscribes to topics on the broker and parses messages for certain events. Parsing functions are defined in the audit detection section.

LogConsumer

The LogConsumer agent subscribes to topics on the broker and writes messages to the remote DB for long term storage.

LogParser

The LogParser agent subscribes to all raw topics on the broker and parses messages for events which signify user command line actions and machine logins. When detected, it writes out to the topics logs.execve and logs.auth.

Umpire

The Umpire agent is responsible for maintaining any events defined in the service configuration umpire section. These can be specific detection events corresponding to user objective, or informational events (type: data) corresponding to adversary or event actions. Requests will either be sent to the OrchestrationActor or LogDetection agents and replies will be received on the replyumpire.detection queue. Specific detection events sent to these agents are combined using AND/OR logic to create objectives. Furthermore, objective may have dependencies on other objectives, meaning it is possible to impose an order on their occurrence.

Topics/Queues

TABLE 3

| Name | Type | Description |
| --- | --- | --- |
| [guid].raw.* | Topic | Raw log message, consumed by the LogProcessor and AuditProcessor |
| [guid].actor.cmd | Queue | Consumed by the actor, used to send commands |
| [guid].logproc.cmd | Queue | Consumed by the LogProcessor, used to send commands |
| [guid].replyumpire.detection | Queue | Consumed by the umpire, used to process detection events |
| [guid].replyai.detection | Queue | Consumed by the ai, used to process detection events |
| [guid].actor.event | Topic | Orchestration events |
| [guid].umpire.objective | Topic | Objective complete events |
| [guid].logs.execve | Topic | User commands retrieved through audit or sysmon logs |
| [guid].logs.auth | Topic | User authentication messages retrieved through system logs |
| mirror.[guid].actor.cmd | Topic | Mirrors of the relevant queues for logging |
| mirror.[guid].logproc.cmd | | |
| mirror.[guid].replyumpire.detection | | |
| mirror.[guid].replyai.detection | | |

In the following sections, the [guid]. prefix is omitted.

Topic/Queue message strings will be encoded with Java Script Object Notation ("JSON").

raw.[sourcename].*

This topic contains messages originating from either system logging or application log files within the environment. The subtopic will contain the 'type' or source of the log followed by the name of the source machine. For example, a message originating from auditd on the machine named server will have the topic 'raw.auditd.server'.

The message string will contain the following values:

TABLE 4

| Name | Description |
| --- | --- |
| time | The source time of the generated message |
| message | The raw string of the message |

This topic contains messages originating from the umpire and correspond to the objective function tags for a mission objective.

TABLE 5

| Name | Description |
| --- | --- |
| time | The source time of the generated message |
| name | Tag name of the objective |

Objective tag names are defined within the mission service files.

replyumpire.detection
replyai.detection

These queues contain messages originating from the log detection service and actor and are related to the specific detection functions which make up the umpire objective and AI checks. Unless otherwise specified, the message string will contain the following values:

TABLE 6

| Name | Description |
| --- | --- |
| name | The topic name of the detection |
| time | The source time of the generated message |
| target | The source name of the machine |
| message | Any data associated with the detection function. |
| description | An optional description of the event with respect to the mission as described in the umpire configuration |

Detection topic names as grouped by method and a description of the message tag content:

1. Network Detection a. network.netstat—list the current network connections message—a list of current external IP connections b. network.active_tcp—list the current TCP network connections message—a list of current external IP connections 2. Process Detection a. umpire.proc_not_running—a given process name is not running on the source machine message—the process name b. umpire.serivce_not_running—none of the provided service are running message—a list of service names c. umpire.pid_not_running—the pid is not running
message—the pid
d. umpire.procsearch_not_running—a given process regex is not running on the source machine
message—the process name regex
e. umpire.file_not_running—a given file name is not running as a process on the source machine
message—the file name
f. umpire.pid_not_running—a given PID is no longer running on the source machine
message—the PID
g. umpire.procre_not_running—a given process regex is not running on the source machine
message—the process name regex
h. status.procs—list running procs
message—a list of the currently running processes including process ID, name, and user
i. automation.get_users—list the currently logged in users
message—a list of the currently logged in users
3. File Detection
a. umpire.file_search—a given message was discovered in a given file against the source machine
message: filename—the file location; querystring—the string which was searched for
b. umpire.files_removed—a given file location no longer exists on the source machine
message—the file location
c. umpire.cron_cmd_removed—a given command no longer exists in a given users cron
message: username—the user whose cron was searched; querystring—the string which was searched for
d. umpire.snort_ip_blocked—(requires snort) a given ip is blocked on the source machine
message—the ip which has been blocked
e. umpire.snort_ip_alert—(requires snort) a given ip exists in an alert on the source machine
message—the ip which is in an alert
f. umpire.sguil_check_session—a user has logged into sguil on the source machine
g. umpire.elsa_check_session—a user has logged into elsa on the source machine
h. umpire.reg_removed—a registry entry no longer exists on the source machine
message—the registry location which no longer exists
i. umpire.derrick_detect_connect—(requires the derrick process) a network detection to a given service has been found on the source machine
j. umpire.derrick_detect_crash—(requires the derrick process)—a network stream which potentially crashes a given service has been found on the source machine
k. umpire.derrick_detect_rop—(requires the derrick process)—a network stream containing a ROP gadget address has been found on the source machine
4. Audit Detection
a. ssh_brute_force—a ssh brute force attempt was detected against the source machine
message—the source of the brute force attempt: telnet_brute_force—a telnet brute force attempt was detected; vnc_brute_force—a vnc brute force attempt was detected; user_login—a successful was detected against the source machine
message: Username—the user name of the login; Source—the source IP of the login; Service—the name of the service logged into
b. john_the_ripper—john-the-ripper has been executed against the target password hash on the source machine
c. file_read—the target file has been read on the source machine
message—the target file name
d. tcpdump_exec—the tcpdump binary has been executed on the source machine
e. group_policy—the group policy editor has been loaded on the source machine
f. port_scan—(requires snort) a port scan was detected against the source machine
message—the source of the port scan
g. sqli_attempt—(requires snort) a SQL injection attempt was detected in network traffic over the source machine
message—the source of the sql injection
5. Command Detection
a. umpire.mission_success—a download of an internet webpage as succeeded on the source machine
6. Environment Commands
a. service.stop—stop a running service
Args: [servicename]
b. service.stop—start a running service
Args: [servicename]
c. user.delete—remove a user
args: [username];kwargs: {force: True}
d. user.add—add a user
args: [username]
e. ps.kill_pid—kill a process by ID
args: [pid]
f. automation.kill_user—kill all user processes
args: [username]
g. automation.block_port—block a given port
args: [port number, protocol=tcp]
h. automation.unblock_port—unblock a given port number
args: [port number, protocol=tcp]
i. automation.block_ip—block a given IP address
args: [ip address]
j. automation.unblock_ip—unblock a given IP address
args: [ip address]
actor.cmd
This queue will contain messages sent from the Umpire and AI component to initiate detection or sensor functionality on the Actor. This will in turn utilize the SALT framework to execute commands on game nodes. Supported command names correspond to those listed in the umpire.detection and ai.detection section:

TABLE 7

| Name | Description |
| --- | --- |
| Name | The topic name of the command |
| cmd_id | A unique id to identify the command and associated response |
| Target | The target name of the machine where the command should execute |
| Args | Any argument relevant to the command |

API
Broker Communication
The internal messaging of the system uses ActiveMQ connectivity protocols (http://activemq.apache.org/connectivity.html). Connectivity between the nxlog producer, the umpire, the AI Agent, and the server consumer utilize qpid-proton (https://qpid.apache.org/proton/index.html) http://stomp.github.io. Messages sent on topics contain JSON encoded strings with additional data as required by the system.

Subscriptions to topics utilize durable subscriptions to guarantee message delivery if the communication is interrupted. Subscriptions also utilize wildcard subscriptions where appropriate for interested topics. For example, the umpire creates a subscribe to the topic raw.> to receive all messages on the raw topic.

The AI and actor utilize a request/response protocol. This uses the following steps:

The AI connects to the broker with username: aiservice password: complexaipassword The AI sends a command on the topic actor.cmd with the message "{'cmd_id': '1234', 'name': 'network_scan', 'target': 'server'}" as well as the AMPQ reply-to field set to 'queue://replyai.detection'

The actor responds on the tqueue 'queue://replyai.detection' with the message "{'cmd_id': '1234', 'message': 'false', 'name': 'network_scan', 'target': 'server'}"

The AI either receives an asynchronous callback or polls their queue subscription and receives the actor's message. This can be through any of the ActiveMQ communication mechanism including STOMP, REST API, AMQP.

Return to #2. Note that multiple commands can be outstanding.

REST API

The REST API is integrated into the Gameserver Django server as an additional remote database. It will support querying for a mission instance:

All Event messages

Paginated Raw Event messages for a given machine starting at a given time stamp

Objects will be presented in paginated form with the following properties:

Master reads the configuration files and pushes the information to the Orchestration Agent, which converts the configuration directives into the actual commands needed to update the target systems.

VEM

As also noted above, the VEM is responsible for creating virtual environments as well as launching the orchestration agent process. In one embodiment, the VEM exposes as REST API, which can be used to create and manage missions as well as the orchestration process. A SALT master runs on the VEM, which manages all Env Masters which in turn manage their respective mission instances.

All SALT state and pillar files as well as the mission configuration files are on the VEM. Once created, SALT state files and mission specific SALT pillar files are copied to the Env Master. A publish process is then launched on the Env Master to initialize all VMs.

Env Master

The Env Master publishes and maintains each mission instance. The Env Master is specific to a mission instances and is also responsible for running the Event subsystem processes including the Umpire. The Env Master runs a SALT minion whose master resides on the VEM, as well as a SALT master which manages all VMs running within the mission instance.

File Store

The File store is a repository for binary data used within the mission instances. This includes OS mirrors (Ubuntu, CentOS) as well as custom executables and fake data. The File Store is mounted using FUSEFS onto the Env Master.

TABLE 8

| Name | Description | Type | |
|---|---|---|---|
| count | Number of items in the associated list | Integer | |
| next | URL of the next page of the list, or null if none | String | |
| previous | URL of the previous page of the list, or null if none | String | |
| results | List of objects | List | |
| URL | Action | Parameters | Description |
| /missionsessions/:id/events | GET | | Returns a list of the event messages for a mission instance |
| /missionsessions/:id/rawevents | GET | Target starttime | Returns a list of the raw event messages for a mission instance |

Mission Orchestration Service

Additional details of the Orchestration Service will now be provided. As noted above, the Mission Orchestration Service is a component of the system that takes the mission design template and creates the virtual environment (e.g. the Cyber Range). The Orchestration Service thus adds in or builds the mission specific configuration of the Cyber Range, including the randomized features thereof (and may comprise a system subsystem for transforming textual configuration files into a corresponding virtual environment container including networking and service configurations).

Orchestration Service Components

Figure 6:
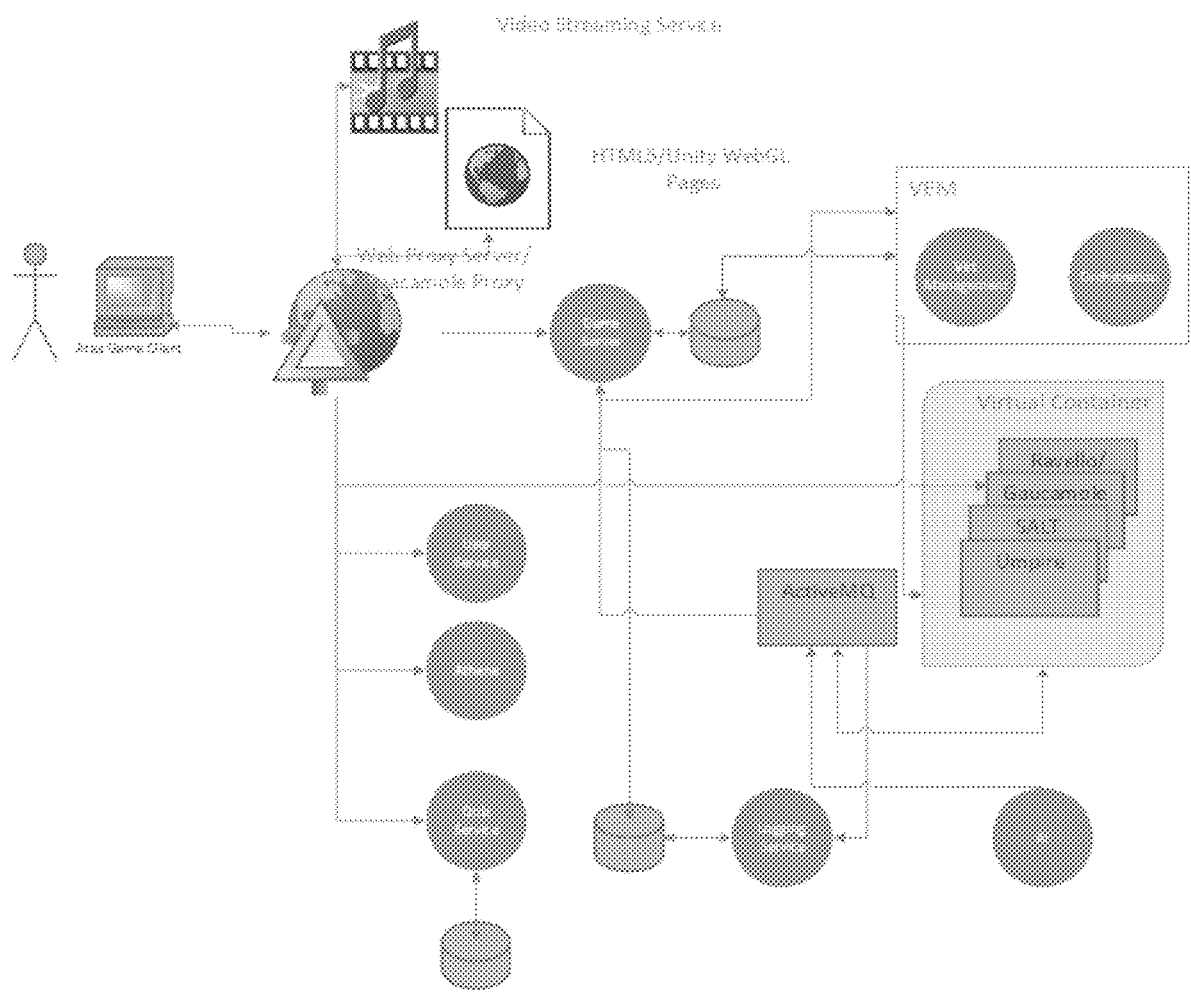
FIG. 6 illustrates additional features of a system of the invention.
Figure 19:
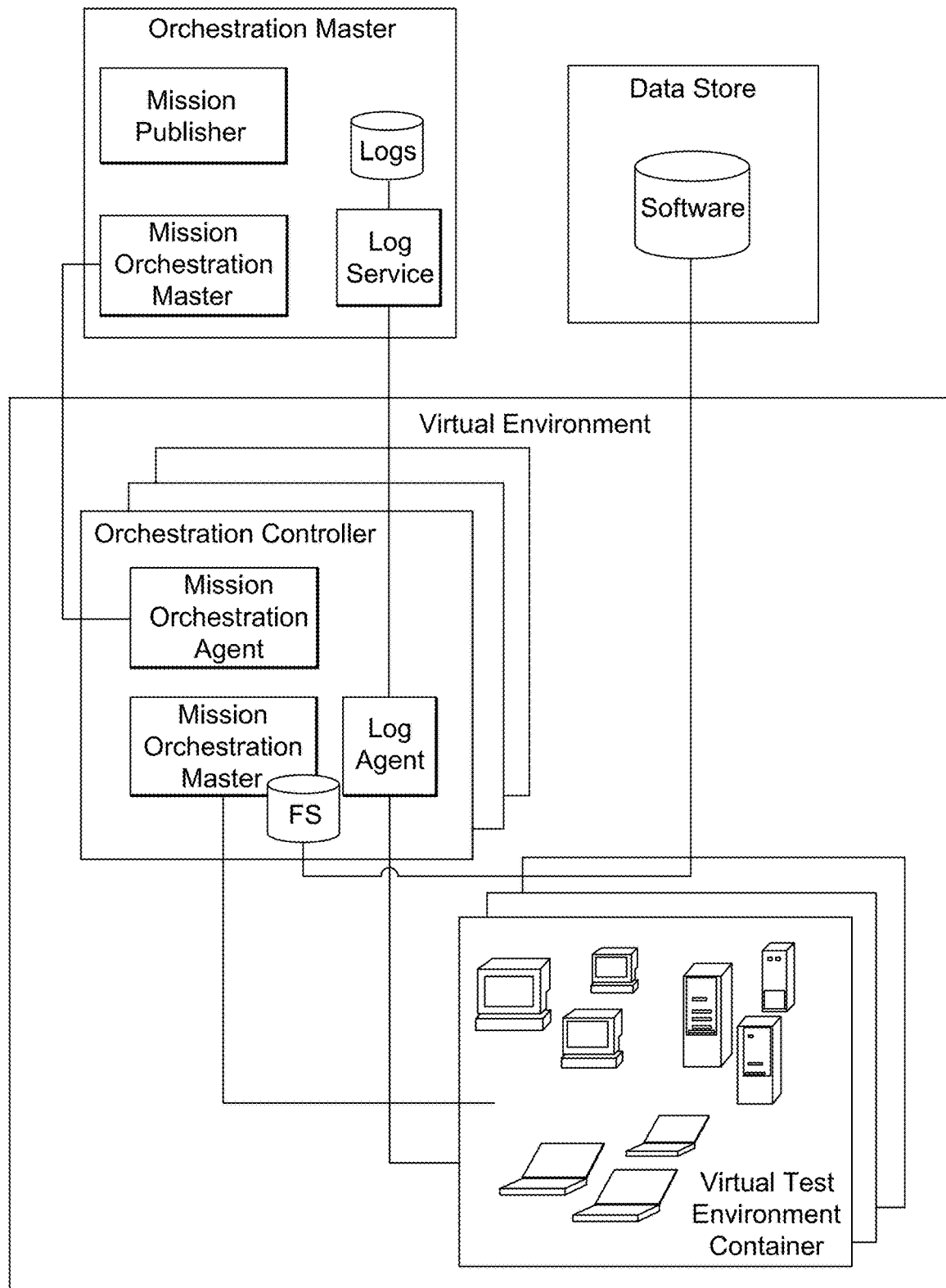
FIG. 19 illustrates one embodiment of a mission orchestration configuration of a system in accordance with the present invention.

As illustrated in FIGS. 6 and 19, the Orchestration Service includes the Mission Orchestration Master and the Mission Orchestration Agent, as detailed above. The Orchestration Variability Variability is introduced into the mission instantiations during the orchestration phase of a mission deployment. As noted above, this allows the system to create a multitude of different missions rather than allow the players to play the same missions over and over or require the operator of the system to custom-configure different missions. In one embodiment, mission variability may include variability in one or more of: mission environment and mission objectives, including variability in the mission network (devices, operating systems, IP addresses, running services, etc.), vulnerabilities, tools and the like.

The mission configuration files (services.yaml, network.yaml) are transformed on the VEM into a mission instance specific set of pillar files. These files are copied to the Env Master and used to configure the VMs.

Service Variables and Service Grouping

Service variables are identified in services.yaml. Variable substitution is used, where the variable is defined in variables and assignments tag, and is resolved in controller.py read_services function (as used below, the term drupal refers to a type of webserver).

```
variables:
  assign:
    drupal_port:
      [80/tcp]
    distcc_port:
      [3632/tcp]
    vsftpd_port:
      [2121/tcp, 6200/tcp]
    drupal:
      [apache, mysql, php, sqli_listen]
    distcc:
      [distcc, distcc_listen]
    vsftpd:
      [vsftpd, vsftpd_listen]
  random_choice:
    remote_service:
      drupal
      distcc
      vsftpd
    rand_password:
      [r3gionali5m, uc4yali, 4mbuscader, n00rdheuwl,
        sulzberger, broadAxe, scoopful, news_stands,
        voortrekker,    m4dm4D,    LyndOn,
        4udiblyv1mVim]
assignments:
  assign_extend:
    remote_service_ports:
      remote_service
      port
  assign_service:
    remote_services:
      remote_service
```

The variability is derived in random_choice, where the system specifies a key k with a list as value. In controller.py a single item from the list is chosen, and replaced with (((k))) in services.yaml later on. For instance, one of the twelve passwords is chosen randomly to be the password that is replaced by the pattern (((rand_password))).

Similarly, one of the three services drupal, distcc, or vsftpd is chosen for remote_service.

Functionality is provided by the system for assigning values to keys, which allows grouping of services using one key. For instance, under assign the group drupal is composed of four different services apache, mysql, php, and sqli_listen (referred below in random_choice).

In certain instances, the randomly chosen value of the service dictates other variables. For instance, the type of service chosen dictates what ports should be open on a firewall.

In assignments, the values chosen are used in assign and random_choice to set other keys to be used later on. For instance, assign_extend uses the key remote_service_ports.

All occurances of key are replaced with concatenation of value chosen in random_choice for key remote_service, "_" and the second value of the list passed (in this instance "port"). The concatenated string is looked up in assign and its value is replaced by (((remote_service_ports))). If drupal was chosen for the remote_service random choice, then the key drupal_port is looked up in assign and that value is used for the occurance.

Similarly, assign_service is looks up service groups that had been chosen randomly. In example above, remote_services is used as a key, which is replaced by the remote_service chosen in random_choice. That value is then looked up a second time in assign to get the service list that correspond to a particular service group. The service list is replaced by (((remote_services))).

Random Networks

Random network can be created for specific port groups. In the specific VApp (a virtual machine-ware construct/term which describes a mission environment), the ports or interfaces are assigned to the randomN group (where N is some integer). Under this tag in the blueprint.yaml file, the ip are specific with the same name, i.e.

```
server1:
  networks:
    "random1":
      type: static
      ip: random1
      mask: 255.255.255.0
```

When transformed on the VEM, all ports belonging to the random1 group are assigned a random IP from the same random 24-bit subnet. Additionally an entry in the network.yaml file is used to specify both machine members and any configuration is applied to this network including routing and dns.

```
random_networks:
  network: random1
  routes:
    dest: 0.0.0.0/0
    gateway: router
  members:
    server1
    router
```

DHCP Networks

DHCP is enabled through the network orchestration configuration and service orchestration configuration for the DHCP server. Configuration requires setting the following components:

The domain name server
The DHCP address range
The gateway
Any static address (the DHCP server should be set here)
The network orchestration block looks like:

```
networks:
network 192.168.0.0/24
static:
  192.168.0.5
dhcp:
  domain name servers:
    192.168.1.12
  range:
    192.168.0.100
    192.168.0.200
  routers:
    192.168.0.5
```

Machines configured in the blueprint on the specified network (unless specified under the static tag) are configured with DHCP on their appropriate interfaces. DHCP ignores network settings obtained from the blueprint (unless included under the static tag above).

Transformation Types (Deprecated)

When services are configured, certain generation functions of the servicetransformations package are used to replace configuration variables. For example, plaintext passwords can be transformed into hashes.

These types are tagged with transform. For instance
transform:
  userconf
    root:
      password: xPwjuhcm8P
    idrago:
      password: (((rand_password)))
      uid: 1001
Services
A service configuration looks like:
ADinstall:
  name: activedirectory.install
  service: activedirectory
  stage: stage1
  type: state
  salt:
    adminpassword: password1234

The name tag corresponds to a SALT state name. The service tag corresponds to the SALT pillar file which will be created based on the value under the SALT tag. It is possible for multiple service configuration files to share the same SALT pillar file in which case the SALT value will be appended to the file. Note that while pillar files are unique to individual machines, they share any transformation for a service configuration. This is useful for example when generating random domain names to populate both the domain name server and the targeted web server.

REST API

The Orchestration API is accessible through the VEM. The SALT environment, and {salt-pk} referenced in the table below is not available until the mission instance reaches the state started (4). The salt-pk can be obtained by querying the /internal/missioninstances/{pk}/ endpoint where {pk} is the ID of the mission instance in VEM.

An additional endpoint will be added on the VEM to access the local machine configuration. The machine configuration will be returned encoded in JSON as a list containing all machine in the environment and their associated IP addresses.

TABLE 9

| URL | Action | Parameters | Description |
| --- | --- | --- | --- |
| /internal/salt/{salt-pk}/ | GET | | Returns the publish status |
| /internal/salt/{salt-pk}/state | GET | | Returns the publish status for each VM |
| /internal/salt/{salt-pk}/publish | GET | ip: ip address of master<br>port: ssh port of master | Create and publish the SALT environment |
| /missioninstances/{pk}/environment | GET | | Returns the local machine configuration |
| /internal/missioninstances/{pk}/environment | GET | | Returns the complete local machine configuration |

Variability is introduced during the publish step of orchestration. The configuration values are read, transformed, then written out to salt models and saved in the local mission instance database. The process is as follows:
Read mission machine configuration blueprint
Read mission Network configuration
Transform network objects
Read mission Service configuration
Transform service objects
Write out SALT pillar files
Save local machine configuration blueprint An example of the machine configuration for a disable web mission (e.g. an offensive mission where a user brute forces a server and shuts it down) follows in JSON:

```
["client1":{
    "networks":{
        "control":{
            {"ip": "10.0.0.10"},
            {"netmask": "255.255.0.0"}
        },
        "data1":{
            {"ip": 172.16.0.10},
            {"netmask": "255.255.255.0"}
        }
    },
},
"router":{
    "networks":{
        "control":{
            {"ip": "10.0.0.10"},
            {"netmask": "255.255.0.0"}
        },
        "data1":{
            {"ip": 172.16.0.11},
            {"netmask": "255.255.255.0"}
        },
        "data2":{
            {"ip": 192.55.0.1},
            {"netmask": "255.255.255.0"}
        }
    }
},
"server":{
    "networks":{
        "control":{
            {"ip": "10.0.0.10"},
            {"netmask": "255.255.0.0"}
        },
        "data1":{
            {"ip": 192.55.0.185},
            {"netmask": "255.255.255.0"}
        }
    }
    "services":[
        "apache",
        "mysqld",
        "sshd"
    ]
}
]
```

Orchestration Class Structure

Figure 20:
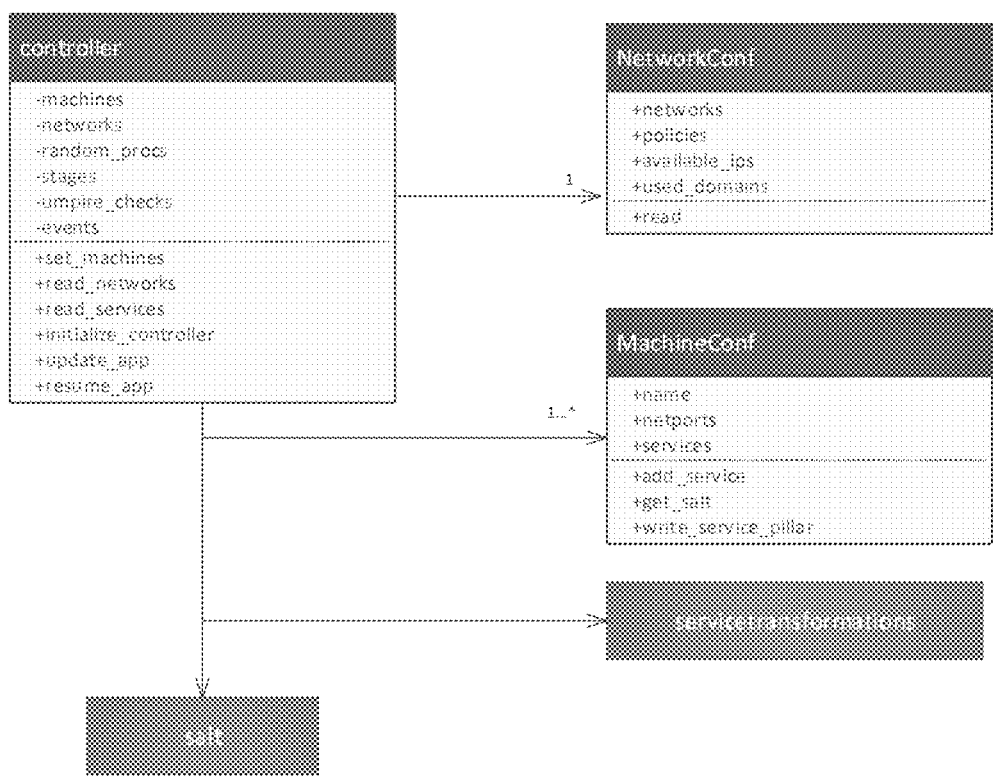
FIG. 20 illustrates class structures for an orchestration component of an embodiment of the invention.

This section describes the class structure for the orchestration component of the VEM server. See FIG. 20.

Additional details of the invention will now be described.

Mission Orchestration

FIG. 19 illustrates one detailed embodiment of a mission orchestration configuration. The Orchestration Master is a subcomponent of the VEM (identified above). It will be appreciated that other configurations are possible. In the embodiment illustrated in FIG. 19, using a third party virtual computing communication/management framework, such as that provided by Saltstack, the Mission Orchestration Service is responsible for managing an Orchestration Controller (OC) as well as the services within the training environment. The OC exists within the virtual environment and is unique to each environment. An Orchestration Master (OM) exists outside of the virtual environment, as a subcomponent of the VEM in one embodiment, and is responsible for managing multiple OCs.

Upon environment creation, the OM populates the OC with the required configuration files for the test environment. The OC runs the Mission Orchestration Service and a local DHCP service over the management network within the environment. The OC runs both a Mission Orchestration Master and a Mission Orchestration Agent. The OC acts as the master configuration and communication point for the entire mission-specific virtual environment. Configuration and monitoring commands are sent from the OC to individual agents running on the virtual systems which make up the mission environment.

The Mission Orchestration Agent on the OC contacts the OM as its master to facilitate command-and-control as well as configuration file updates. The OC runs a master service to control the local test environment. The test virtual machines are preconfigured to obtain a DHCP address from the OC on the management network. The test virtual machines are also preconfigured with a Mission Orchestration Agent and contact the OC as their Mission Orchestration Master.

When the OC is up to date with the environments configuration files (from the OM), it updates all of the local environments virtual machines. The OC securely mounts a read-only filesystem from a data store comprised of software packages required for the test environment. These packages include both standard packaging (i.e. mirrors of CentOS and Ubuntu software repositories) and custom software to run within the environment. The software is made available to the test environment virtual machines during the initial configuration stages.

A Mission Publisher service runs on the OM which translates the provided environmental configuration files into the mission orchestration environment. These include virtual machine descriptions (e.g., Ravello blueprints and ESXi designs) as well as a network and service configuration file. The network file defines the test network as well as features pertaining to the test network such as gateways and DNS servers. The service file defines services and configuration details of what will run on the virtual machines within the test environment. As described below, in one embodiment the network is defined by a diagram (such as a Visio® diagram) and a human readable data serialization language file (such as a YAML file) with specific configuration details such as the IP address, host name, open ports and key services, functionality running on that host. The diagram is used to lay out the network components visually as game objects with attributes as defined by the YAML file. Of course, other file types might be utilized.

Network-based and host-based software sensors are built into the system to monitor a wide variety of system attributes, states and real-time activities during student missions. For example, host-based system software sensors include applications monitoring log data generated by the system executing concurrent with system operation, state information captured by processes executed during system operation, and background sensor processes that detect one or more system state changes.

Open source, multiple-platform log management functions, such as NXLog, runs within the environment to collect and offload logs from the OC and test environment virtual machines. The system generates one or more logs of information, such as a Syslog (which provides a common logging interface to aggregate log messages from multiple software components) and SALT logs (which capture and log information from the Salt orchestration commands and responses) are collected, tagged and sent over management networks to the OC and the OM where they are archived for long-term storage. See FIG. 19.

System Mission Publisher Service
Virtual Machine Description
The virtual machine description includes the following details:
(1) Machine name;
(2) Control network interface MAC; and
(3) Any data network interface MAC, IP/MASK, static or DHCP.

These details are translated into a VirtualComponents.NetworkConf class which is later combined with a network.yaml configuration.Network Configuration The network configuration is a human-readable data serialization format YAML file, which defines the networks as well as their gateways, static routes, DNS servers, and DHCP servers. A sample network file is as follows:

TABLE 10

```
networks:
    - network: 192.168.1.0/24
      domain_name_servers:
        - 172.16.0.16
      routes:
        - dest: 0.0.0.0/0
          gateway: 192.168.1.5
    - network: 172.16.0.0/24
      domain_name_servers:
        - 172.16.0.16
      routes:
        - dest: 0.0.0.0/0
          gateway: 172.16.0.16
        - dest: 172.16.10.0/24
          gateway: 172.16.0.15
    - network: 172.16.10.0/24
      domain_name_servers:
        - 172.16.0.16
      routes:
        - dest: 0.0.0.0/0
          gateway: 172.16.10.15
```

This file is read in and combined with the virtual machine description data to create SALT pillar files used for network configuration of the data network interfaces.

Service Configuration

The service configuration is a YAML file, which defines services and configuration information corresponding to virtual machine names. Supported services include any built in SALT state capabilities as well as service plugins described in a subsequent section. The service configuration has two sections, the first 'configurations' defines the available services and their specific configurations; the second 'services' defines which services should be installed on which virtual machines. Service configuration may be reusable either within a test environment or across environments. A portion of a service configuration follows:

TABLE 11

```
configurations:
    firewall-rules:
        service: firewalld
        name: firewalld
        salt:
            enable: True
            zones:
                external:
                    - interfaces:
                        - 172.16.0.10
                    - port_fwd:
                        - 80:80:tcp:192.168.0.11
                    - masquerade: True
...
apache:
    service: apache
```

TABLE 11-continued

```
    name: apache.vhosts.standard
    salt:
        enable: True
        sites:
            dvwa.com:
                template_file: salt://apache/vhosts/standard.tmpl
            managedtgz:
                - target: /var/www/dvwa.com
                  targetdir: /var/www/
                  source: salt://www_sites/dvwa.tgz
...
services:
    internal_server:
        - nfs-server
        - internal-server-firewall
        - bad-password
        - no-selinux
    webserver:
        - webserver-fw
        - mysql
        - php
        - apache
        - apacheaccess
        - nfs-client
        - bad-password
        - apache-sudoers
    firewall:
        - firewall-rules
    client1:
        - john-the-ripper
```

Service configurations also support configuration transformations. An example usage of this is to transform a plaintext password in the service configuration file into a hashed password, which can be used by the SALT user management state. In this case the service configuration would look as follows:

TABLE 12

```
    bad-password:
        service: users
        name: users
        transform:
            - userconf
            - root:
                password: R00tp@ssw0rd
            - testuser:
                password: ncc1701d
```

The 'transform' tag notifies the Mission Publisher to perform the 'userconf' transformation when reading the following data in (this transformation method is used to convert generic system configuration information into system specific configuration commands which allows for the use of common configuration syntax in the mission database). Using the high-level programming language Python, the following function is defined in the publisher. service-transformation module.

The function is as follows:

TABLE 13

```
def userconf(netconf, *users):
    import crypt
    ret = { }
    for i in users:
        for name, data in i.iteritems( ):
            ret[name] = [ ]
            if 'password' in data:
                pw = crypt.crypt(data['password'],
                    crypt.mksalt(crypt.METHOD_SHA512))
                data['password'] = pw
```

TABLE 13-continued

```
                ret[name].append(pw)
            ret[name] = data
    return {'cfg': ret}
```

The function returns a dictionary structure understood by the SALT users state to configure a username and set the password. This could be further extended or another function written to randomly assign a password from a dictionary.

Another example of a transformation is to configure MAC to static IP address mappings for a DHCP server within the data network. This transformation utilizes both the virtual machine description and the network configuration. This is necessary because MAC addresses can be randomly assigned within the virtual environment.

Mission Configuration Example—DOS

Figure 21:
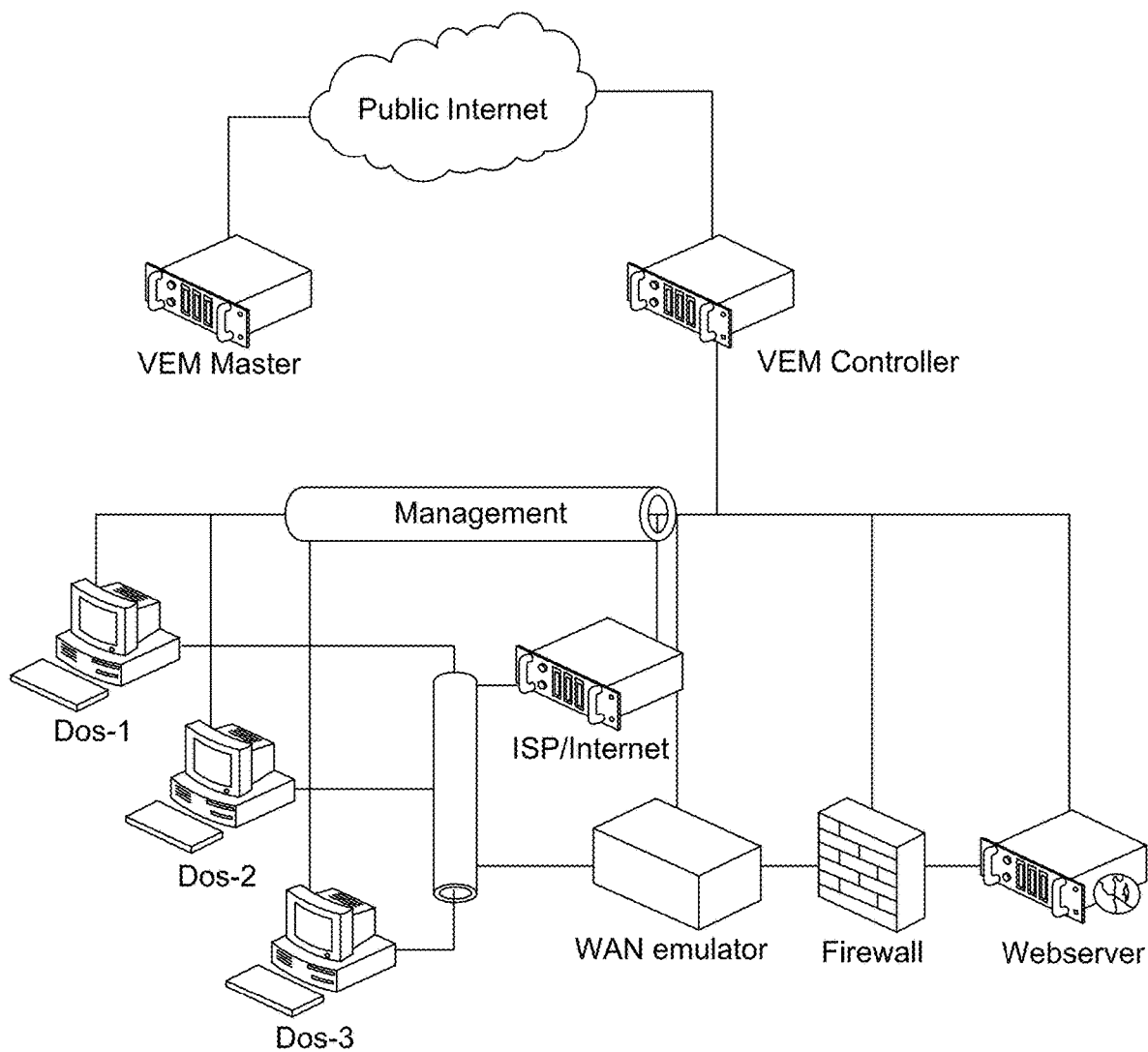
FIG. 21 illustrates one embodiment of an offensive mission configuration implemented by a training system of the invention.

One example of a mission configuration will be described with reference to FIG. 21.

The student is tested with respect to a specific mission, scored and ranked against all other students. Within the virtual environment, virtual machines are configured to run one of a plurality of operating systems and applications wherein each virtual machine emulates specific websites, corporate servers and the like. A student takes on the role of hacker or defender according to the selected mission. One or more students may play against one or more virtual (AI) and/or real opponents.

In a particular embodiment, the present invention allows individuals to test their capabilities against other participants, or an advanced, automated opponent in a realistic virtual environment using a game interface.

Another aspect of the system includes configuring virtual machines within a server-based environment to simulate a real-world network environment complete with realistic industry and governmental websites, servers and other software used by information systems.

Figure 22:
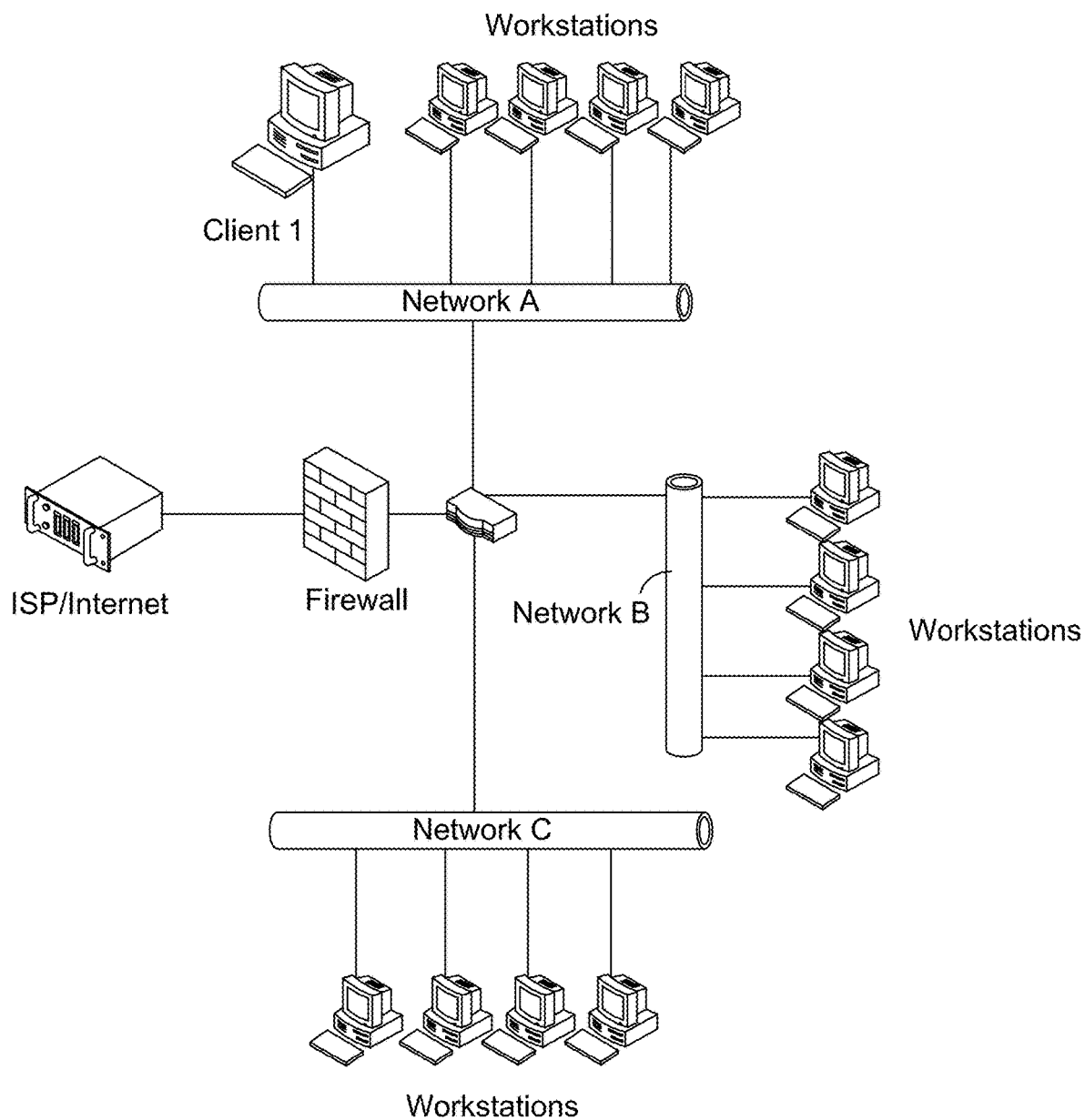
FIG. 22 illustrates one virtual environment for a training mission in accordance with the present invention.

Aspects of the disclosed system infrastructure include: mission creation and recording; deployable virtual environments based on mission selection wherein virtual environments include the use of security components: firewalls, NIDS, Antivirus, and combination of desktops and servers, such as illustrated in FIG. 22.

Unique virtual environments are configured for each mission; the ability to invoke automated capabilities into the environment; verification and recording of results; automated offensive or defensive intelligence deployed based on mission selection; feedback on progress and constraints (e.g. time to accomplish each mission objective); tools the user can utilize in the mission, including: Nmap, Security Onion, Wireshark, etc.; 3rd party visualization of the exercise; user activity logging for post event replay; and a leader board for student result comparison.

Once the disclosed system is configured, the student is presented with an immersive game interface, such as a 2D or 3D game interface, where one or more defensive and offensive mission options are available for selection. Each mission includes detailed descriptions of the mission, environment, and goals; visual displays of appropriate environment assets depending on attack/defend visibility; and realistic access to environmental assets such as terminals and vulnerable applications.

In the immersive game-based training environment, the system presents the student an exciting entry into the game (such as an invitation to join cyber forces—such as by having the AI advisor greet the player(s) and provide context on the mission(s) and why it is important that they help) and initial instructions for the user. Once the student selects the mission, the environment is configured and a visual representation of the available assets is displayed along with credentials to access.

When the mission begins, the student is provided with access to resources, feedback on progress/on-line help, and recording of actions. For example, a student may send a message or query to the AI Advisor seeking hints or tips.

When the mission is either completed or terminated, the system records results, provides reports, and gives the student feedback on mistakes. In one embodiment, the system includes a trainer role that allows the trainer to see all of the missions which are being played. The trainer can select a student to observe and join that mission. The trainer can inject comments via chat to the student and change parameter to make the mission easier or harder. The trainer can also provide advice or answer questions during the mission and make comments in the training record of things the student did well or need to work on as feedback presented in an assessment phase.

Other aspects of the disclosed system include mission monitoring for trainers through the use of spectator visualizations of live gameplay and reporting/visualization of historical results per mission/student.

The game play aspect of the system scenarios include advanced oppositional attack/defend strategies, exploitation vectors, and complex network setups. In addition, the system uses scaffolding (e.g., AI or trainer support and interaction as part of the training process) as a gaming technique to focus and train the student on particular skillsets. Game levels employ a combination of structured and free-play to accomplish a pre-defined overarching training goal. Students are provided subtasks or hints to guide them in their accomplishment of said goal. Additionally, in-game feedback is provided for a pass/fail of subtasks. Subsequent levels are built upon and expand knowledge learned in previous levels.

In other aspects of the system, a Mission Administration component provides:

(1) Creation of mission profiles, including all roles, tasks, goals, and overall parameters defining the mission as well as the definition of the virtual environment needed to house the mission.

(2) Execution of the mission, including orchestration between the Mission Administration and the Virtual Environment Administration, running the appropriate AI tasks based on mission profile and student actions, recording all activity within the mission, providing in-mission feedback, and scoring all student performance.

(3) Production of mission historical analytics, including presentation of mission statistics across all students. The historical game play data will also be utilized by the in-game AI logic to learn and adapt its strategy over time. This enables the game play to change when playing the same mission repeatedly. The game play data repository can also be scanned to identify novel new student tactics and techniques.

(4) Production of student historical analytics, including presentation of student statistics across all missions. In one embodiment, a student creates a student profile and accesses the system using a login associated with their profile. The student's activities are monitored, such as by recording their actions, performed skills/tasks and the like. This information is stored in a data file which may be exported as a training record for that student. This record serves as a persistent record for the student that can be used to review student performance, including skill improvement and regression.

Figure 23:
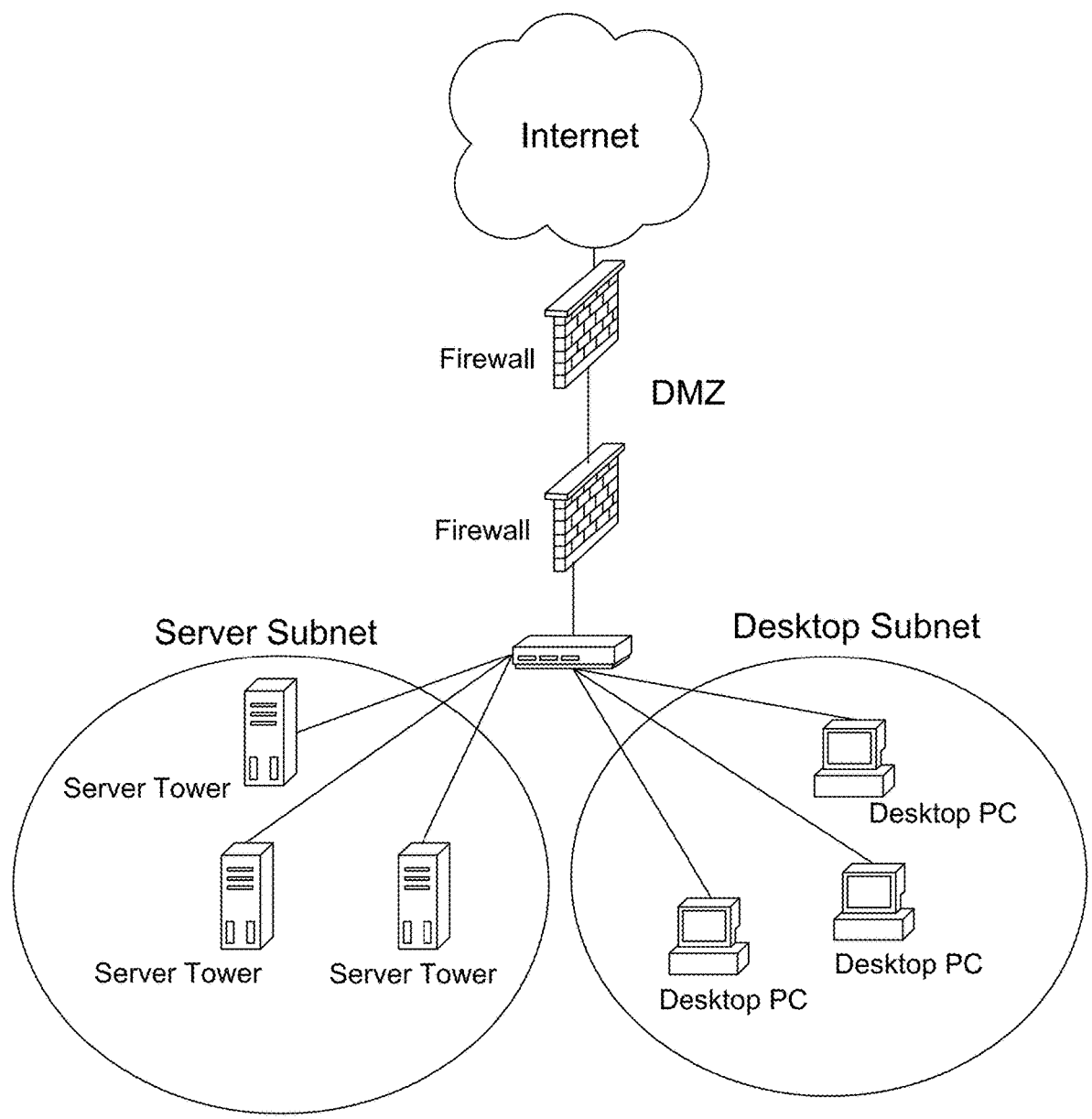
FIG. 23 illustrates another virtual environment for a training mission in accordance with the present invention.

In the virtual environment administration aspect of the disclosed system, a fully realized environment is provided for each mission. The virtual environments include all key components in order to make the training experience a realistic representation of an industry or government agency network environment and information system. As illustrated in FIG. 23, the environment might comprise:

(1) A combination of servers and desktops with appropriate software to expose desired vulnerabilities;

(2) Security components typically found in a small enterprise: firewall, IDS, etc.; and/or (3) One or more subnets with different security constraints for a majority of anticipated missions.

AI Opponent

As described, a mission opponent may comprise an AI opponent (which AI opponent may comprise a defensive opponent to one or more offensive live students or an offensive opponent to one or more live defensive students). In one embodiment, the AI opponent comprises a set of applications and processes focused on parsing all aspects of the system in real-time such as logs, network messages, databases and database states, and the like, to determine if something of operational importance has changed within the particular training scenario. The AI opponent interacts with the Orchestration Agents to obtain information and make operational changes. For example, when the AI component of the system detects a data change and a set of unexpected messages in a cyber threat scenario, it attempts to deduce from a knowledge database the implications of such a scenario and determine all possible root causes. As the AI component gathers additional data to narrow in on the cause, it may provide messages to trainers and students (such as hints, tips or warnings, such as by presenting messages through the in-game advisor feature), it may make changes automatically to the virtual environment within the training scenario in an attempt to remedy a potential breach, it may parse additional aspects of the virtual environment to gather more information, or it may do nothing and continue to monitor. In this way, the game play between one or more human students against an AI opponent emulates real-life scenarios wherein the AI opponent takes actions that a typical administrator would take given the detection of one or more possible cyber threats or system anomalies. In other configurations such as health care training, power grid infrastructure training, custom organization network training, etc. the AI component's knowledge database includes specific details associated with the training and the training scenario at hand.

AI Advisor

The AI advisor uses Natural Language Processing (NLP) to understand user questions and provide appropriate answers. The AI advisor interfaces with the game server to understand mission context and log Q&A information. The UI interacts with AI advisor to ask questions and receive answers.

Observer/Trainer

The trainer has a view of all players and can drill down on specific player interactions as needed. The trainer can obtain a mirrored view of the player's desktop which allows them to view their moves in real time.

Scoring, Analysis and Replays

In one embodiment, the games or missions are scored (such as via the game server monitoring game play activities/actions and awarding points based upon particular criteria). Points may be assigned to particular skills, mission tasks, etc., such as based upon criteria including the complexity of the skill, the complexity of the task, the time taken to complete a task and/or other criteria. Based on points and other criteria (such as time, detection avoidance, and identification of non-mission specific targets and assets) students earn during training and/or missions, a student obtains a score. The student's score may be used by trainer to assess the student's aptitude, such as areas where the student is strong or weak, and may thus be used by the trainer to customize additional training for the student or other education on particular skills.

In one embodiment, player scores may be listed on a leaderboard where teacher/observers can monitor mission results and how the student rates to other students. Players may earn virtual badges for achieving certain levels of points relative skills, missions, etc., (for example, a particular mission might have a total possible score of 1000 points and only those players who earn at least 950 points might be awarded an expert defender badge for that mission). In another embodiment, badges might be awarded to players who achieve certain aggregate sums of points. Players might be awarded badges or certain status levels for their performance during certain time periods or the like. The points or badges might be used to certify a player's skill set, including to qualify the player for harder missions (e.g. a player's points may be used to establish a player's competency to a certain level, to qualify them for missions which require certain minimum levels of competency). In one embodiment, points or certifications may expire, thus requiring the student to continue their training to maintain their certification level(s).

Mission Examples for Cyber-Warrior Training POC
Mission Design

Four mission examples follow. It should be noted that much more complex missions are supported by the system. Two of the mission examples illustrate the cyber warrior as the offensive student trying to beat the AI-driven defense. The last two mission examples illustrate the cyber-warrior as the defensive student playing to thwart the AI-driven offense.

Highlights of the missions:
(1) A briefing video is shown to the student as an intro to each mission.
(2) Leaderboard tracks multiple attempts and the score on each attempt. Leaderboard also tracks average scores and best score.
(3) Missions can have Easy, Medium, Hard modes where items such as the AI opponent aggressiveness, mission objectives, and environment complexity are modified based on the selected mode.
(4) When the user selects the mission, the resources are allocated and the virtual environment is automatically created and configured. The AI element is added as part of the configuration.
(5) Other embodiments support scores that count down and missions with fixed durations.

Offensive Mission Example 1
Overview

In this mission, the cyber-warrior, also known as the student, is tasked with stealing a file from a machine located on an internal enterprise network. This mission requires that the student gain a foothold on an external facing application server and pivot to the internal network using a set of provided credentials obtained from previous social-engineering.

Figure 24:
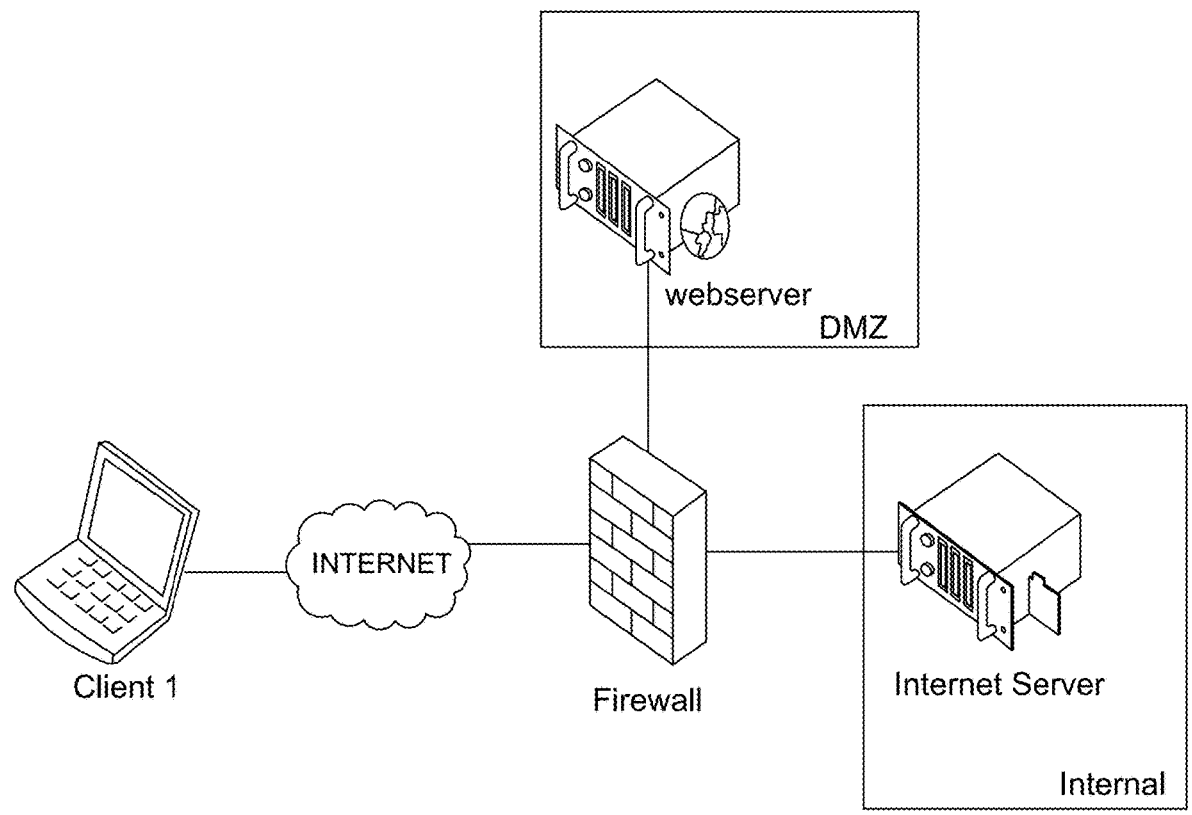
FIG. 24 illustrates another embodiment of mission environment implemented by a training system of the present invention.

FIG. 24 shows a description of the data network for offensive mission 1, data theft from an internal server.

Below is a description of the network configuration as well as relevant services that will be launched on each machine for the mission illustrated in FIG. 10. All network masks are /24 unless otherwise noted.

The VEM Controller runs a SALT-master and nxlog server; all other machine run a SALT-minion and nxlog agent. The firewall includes a specific permission to allow the webserver in the DMZ access to the file server on the internal network.

The webserver has a NFS mount originating from the internal server. The student, also referred to as student, uses either a password cracker on the local shadow file, or a remote brute force tool. The target file (xmas_gift.txt) is put in the home directory when login is successful.

TABLE 14

| Name | OS | Networks | Services | Purpose |
| --- | --- | --- | --- | --- |
| VEM Controller | CentOS 7 | 10.0.0.5 | DHCP (management net) YUM/APT during orchestration configuration | Perform orchestration and act as central log collection node. |
| Client1 | XUbuntu 14.04 | 10.0.0.12 172.16.0.12 | THC Hydra John the ripper | |
| Firewall | CentOS 7 | 10.0.0.10 172.16.0.10 192.168.0.10 | Firewalld Forwarding for port 80/tcp | Restrict external access to DMZ (with DMZ->internal rule present) |
| Webserver | CentOS 7 | 10.0.0.11 192.168.0.11 | Apache PHP, MariaDB NSF-client | Provide a SQLi vulnerable web server |
| Internal server | CentOS 7 | 10.0.0.13 192.168.10.13 | SSHD/telnet-server NSFD | Internal client with target file |

Details

The external facing target system is automatically configured by the system to emulate a corporate website. The cyber-warrior must identify the vulnerable application on the emulated system, perform the SQL injection that gives him access to the underlying file system, and inject a backdoor. The cyber-warrior then accesses the target machine on the internal network from the compromised application server through RDP using stolen credentials to access a sensitive data file.

Student Task Descriptions:
1. Determine vulnerable application providing code execution
2. Write SQL code for injection with backdoor listener or reverse shell
3. Inject SQL code
4. Gain access privileges to public system
5. Access machine on internal network using provided credentials
6. Extract file to attacker machine Task Scoring of Task Descriptions (preferably, a set of points are assigned to each mission objective based upon a degrees of difficulty; these points are tracked in a user history and are used as an indicator of how much the student has played and to what level of difficultly)
1. 15 points
2. 20 Points
3. 20 Points 4. 5 Points
5. 5 Points
6. 10 points System Configuration 1. Three network segments are automatically configured: a public, DMZ, and internal network.

2. A single firewall is automatically configured by the system utilizing a "three-legged" model to restrict external access to the DMZ.

3. Kali Linux is configured for the student (attacker), Linux firewall, Linux web application server, Windows 2012 web application server, and Windows 7 internal target 4. Apache w/php and sql is configured by the system running as a privileged user.

Detailed Design

System automatically configures and sets up the mission as follows:

1. Maria DB for SQL Injection
2. Create a Webform with a Website
3. The system automatically sets up a simulated repo where cracker tool and other tools are present where student downloads tools from outside of the firewall.
4. The system provides Student with a shell on a machine outside the firewall Mission 1. SQL Inject a reverse shell thru a Webform. Success is when the reverse shell launches a connection.

2. Download a cracker tool—need knowledge of netcat or similar tool. Initially copy it to local webserver.

3. Identify the computer that has an open telnet port. Hack into it using the cracker tool.

4. Telnet into victim and extract the file called 'Christmas Present'—gift.txt. Initially, they could cut-n-paste the content. They wouldn't have to extract it. The present will be located in the place where telnet will initially place the user.

Success is defined by the system as follows:
1. When they extract the file (copy the contents)
2. Points for each individual step Offensive Mission 2

Overview

In this mission, the cyber-warrior, also known as student, launches a distributed denial of service attack on a system.

Figure 25:
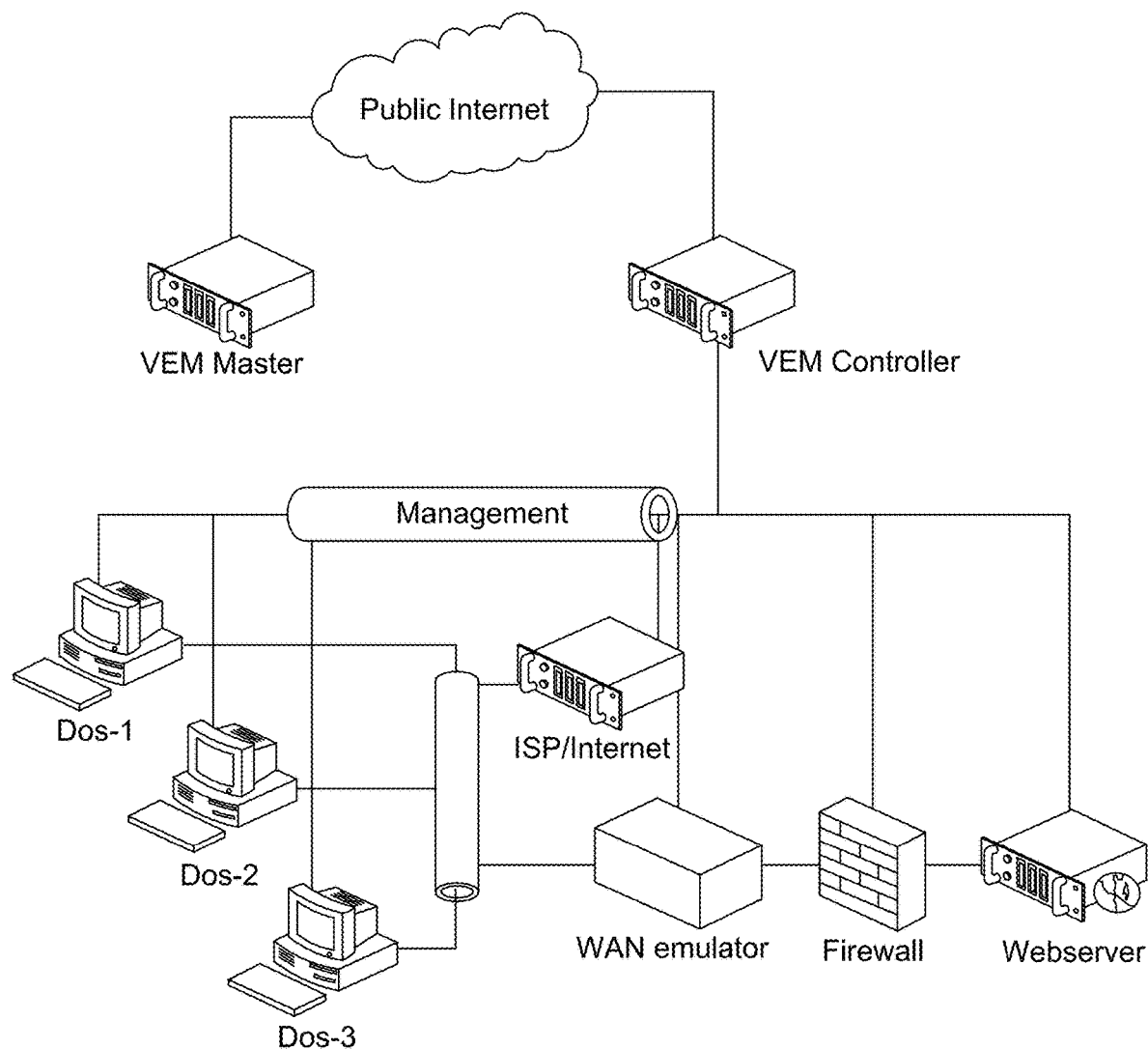
FIG. 25 illustrates yet another embodiment of an offensive mission environment implemented by a training system in accordance with the present invention.

FIG. 25 shows a description of the network connectivity of the offensive mission 2 (DOS attack).

Below is a description of the network configuration as well as relevant services that are launched on each machine. All network masks are /24 unless otherwise noted.

TABLE 15

| Name | OS | Networks | Services | Purpose |
| --- | --- | --- | --- | --- |
| VEM Controller | CentOS 7 | 10.0.0.5 | DHCP (management net) YUM/APT during orchestration configuration | Perform orchestration and act as central log collection node. |
| Dos-1 | XUbuntu 14.04 | 10.0.0.10 172.16.0.10 | | Student controlled machine. |
| Dos-2 | XUbuntu 14.04 | 10.0.0.11 172.16.0.11 | | Student controlled machine. |
| Dos-3 | XUbuntu 14.04 | 10.0.0.12 172.16.0.12 | | Student controlled machine. |
| ISP/Internet | CentOS 7 | 10.0.0.16 172.16.0.16 172.16.11.11 (alias) | Named Authoritative & caching | Provide DNS services to client machines |
| WAN | CentOS 6.5 | 10.0.0.15 172.16.0.15 172.16.10.15 | tc netem 100 Mb/s, 10ms latency | Constrain the bandwidth available between the clients and webserver |
| Firewall | CentOS 7 | 10.0.0.13 172.16.10.5 192.168.1.5 | Firewalld Forwarding for 53/udp and 80/tcp | Provide basic firewall functionality in front of the webserver |
| Webserver | CentOS 7 | 10.0.0.14 192.168.1.14 | Apache http://www.whitehouse.gov Named Authoritative for whitehouse.gov | Target webservice for student |

Details

The cyber-warrior is provided with 3 machines with which to launch a denial of service attack on the target system. The student must write the DoS script that utilizes the available machines in a multi-thread fashion. Overall, the cyber-warrior must deny service for X minutes, where X is a configurable parameter.

Task Descriptions:
1. Prepare machines and environment for use in the DoS attack
2. Create script
3. Execute and maintain attack Task Scoring as it relates to each of the Task Descriptions
1. 15 Points
2. 30 Points
3. 30 Points Detailed Design System automatically configures and sets up the mission as follows:

1. A Webserver is configured for the student with the Whitehouse website scraped and running.
2. A worker process is created by the system that simulates large requests by doing a spin cycle. This is to simulate a form processing.
3. A large binary file is provided by the system.
4. The system monitors CPU, Memory, Network, and Control the network coming in.
5. Open port 80.
6. Provision servers to match the environment they are attacking (Simple/Advanced)
7. As an option, a load balanced set of webservers is configured by the system
8. The student uses multiple attacking systems (DDoS)

Simple Mission

1. Download a large binary file (2015 Budget). Only if the student downloads this large file, will they DDOS the system.
2. Multiple data accesses to a single computer/machine, such as via a wget tool Advanced Mission The system may add further complexity to any mission such as providing a form on the website that involves a large database request that hits with CPU and network traffic.

Student success is defined when:

1. Student is able to monitor the CPU, Memory and Network.

2. Kill it after it reaches a threshold—80% or based on validating that the user has initiated the desired attack vectors.

Defensive Mission 1

Overview

In this mission, the cyber-warrior, also known as student, will diagnose a likely data exfiltration, find it and block it.

Figure 26:
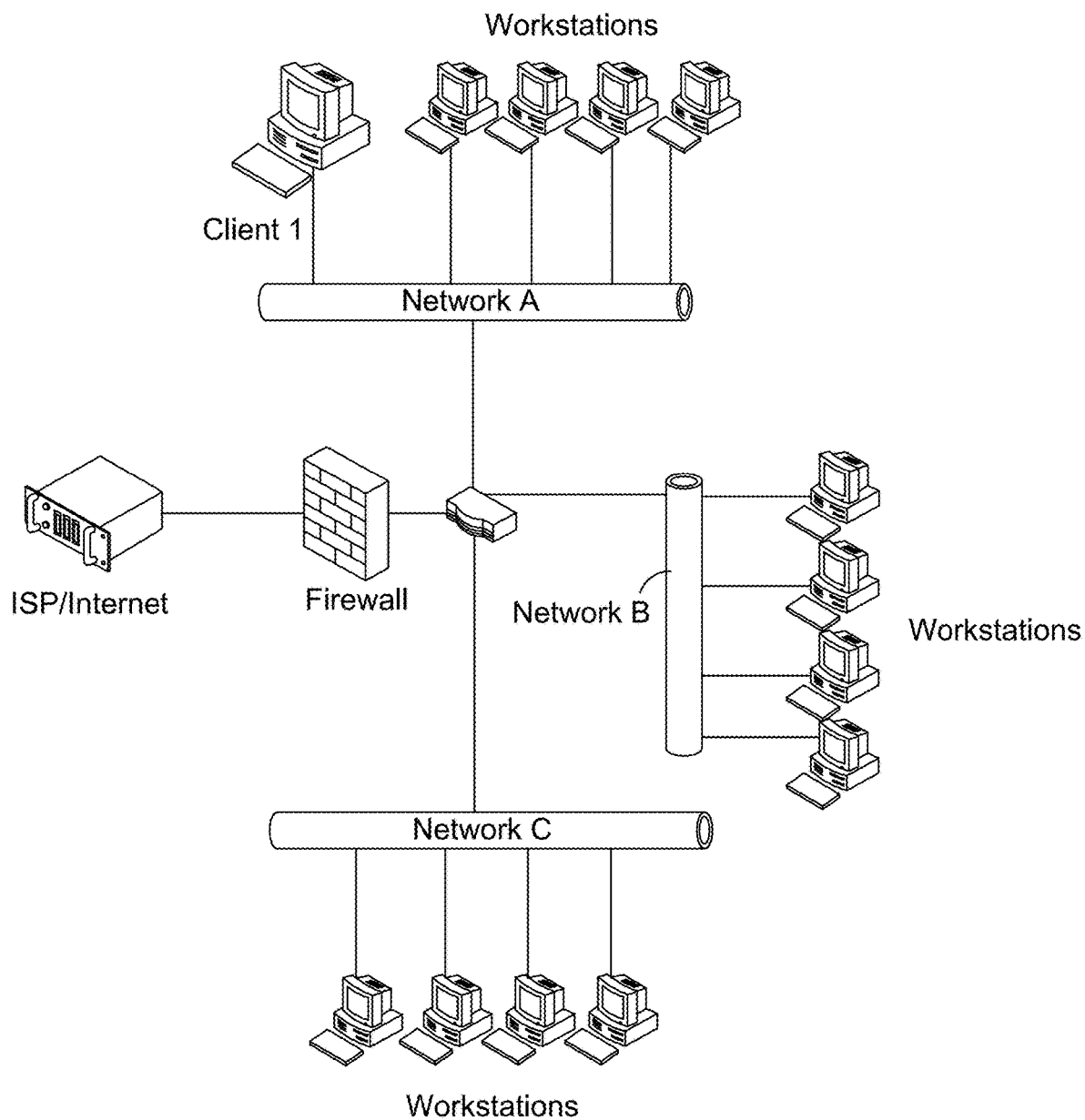
FIG. 26 illustrates an embodiment of a defensive mission environment implemented by a training system in accordance with the present invention.

FIG. 26 illustrates the data network for the exfiltration scenario. The management network has been omitted for clarity, but it matches that of all other scenarios.

Below is a description of the network configuration as well as relevant services that will be launched on each machine. All network masks are /24 unless otherwise noted. The firewall node acts as the router for the internal network routing subnets to one-another.

TABLE 16

| Name | OS | Networks | Services/Tools | Purpose |
|---|---|---|---|---|
| VEM Controller | CentOS 7 | 10.0.0.5 | DHCP (management net) YUM/APT during orchestration configuration | Perform orchestration and act as central log collection node. |
| ISP/ Internet | CentOS 7 | 10.0.0.10 172.16.0.11 172.16.11.11 172.16.12.12 | Named Authoritative & caching for multiple sites Apache for multiple sites | Simulate internet connections: provide DNS resolution, provide static web pages, host exfiltration server |
| Firewall | CentOS 7 | firewalld | Masquerade outgoing connections tcpdump | Provide data collection point of all internal traffic to student |
| Client1 | XUbuntu 14.04 | 10.0.0.12 192.168.0.12 | Wireshark snort (not configured) bro (not configured) | Student machine |
| Work- stations | XUbunu 14.04 CentOS 7 | 10.0.0.13- 10.0.0.24 192.168.0.13- 16, 192.168.10.17- 20 192.168.20.21- 28 | Httperf (subset) | Create background noise in the form of DNS and http |
| Red Work- stations | Xubuntu/ CentOS | Chosen from workstations | Exfiltration client | Host the exfiltration software |

Details

The cyber-warrior must scan logs, identify the error code that suggests there is a data exfiltration issue related to a vulnerability in HTTP.sys, identify the affected system, locate the exfiltration code, and remove it.

Task Descriptions
1. Scan logs
2. Scan servers for vulnerability
3. Remediate vulnerability
4. Locate and block exfiltration code Task Scoring as it relates to each of the Task Descriptions
1. 10 points
2. 10 points
3. 15 points
4. 15 points Necessary Environment and Tools Detailed Design System automatically configures and sets up the mission as follows:

1. 3 subnets are configured with multiple systems
2. One or more systems are exfiltrating data.
3. Simulated webservers and traffic generation.
4. Network is setup with port 80 and other outbound traffic
5. Student is dropped into a console on one of the machines
6. Traffic gen is a simple wget loop. One of them is a bad website.

Simple mission version:
1. Detect one exfiltration to a non-standard port

Advanced mission version:
1. Multiple ex-filtrations
2. Have one of the system that slowly sends data out using netcat (on port 80).
3. Make the ex-filtration process capable of auto restart so just a kill will not suffice.
4. Additional obfuscation of the infiltrating process and its location Mission
1. Defender must monitor traffic on all 3 subnets and look for abnormalities.
2. Defender must: Scan network; Login to all 3 subnets; Have a packet monitoring like Snort/Tcpinfo to isolate exfiltration traffic; Shutdown exfiltration; Identify the user.

Success: Defender has identified ex-filtration and shut it down; and Defender identifies the user.

Defensive Mission 2

Overview

In this mission, the cyber-warrior, also known as student, must identify misconfigured NFS on a slave within a cluster of machines and remove a Trojan.

Details

Once the AI attacker has exploited a misconfigured NFS and deposited a Trojan, the cyber-warrior will scan the machines within the cluster to find the slave with the misconfiguration. Then, he will fix the misconfiguration to block the vulnerability. Then he will find the Trojan and remove it.

Task Descriptions
1. Scan cluster for misconfiguration
2. Configure NFS
3. Locate Trojan and remove it Task Scoring as it relates to each of the Task Descriptions
1. 10 points
2. 5 points
3. 15 points Necessary Environment and Tool Detailed Design System automatically configures and sets up the mission as follows:

1. NFS environment with multiple subnets—A, B, C. A has NFS, B uses NFS and C does not.
2. Plant a Trojan—indicator process owned by root and is executable by all. Also need other files that are not Trojans.

3. Multiple mis-configurations

4. Student is dropped into an Admin shell

Student's Mission

1. Need to figure out who is exporting outside of the authorized subnet

2. Find all N NFS servers and list out names in a Text File

3. Ensure correct permissions. Put in a * in mis-configuration and have the defender find it.

4. Fix it by logging into the bad one and fix config and restart NFS.

5. Find the Trojan which is running. Maybe this changes the NFS configuration back if they don't kill it.

Success

1. Defender has identified all mis-configured NFS servers.

2. Defender has rectified the configuration.

3. Defender has found and neutralized the Trojan.

As used herein, the term "software", "applications" and the like, preferably means machine-readable code fixed in a tangible medium (i.e. non-transitory), such as a memory device. Such software may comprise one or more modules or other arrangements of such code. Preferably, the software, such as the applications herein, when executed by one or more processors, effectuate the above-described functionality.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A system for providing mission-based cyber-threat training to a student against an opponent comprising:

a student station comprising a processor, a video display and a student input device;

a system server comprising a system server processor and a system server memory, said system server in communication with said student station over an interface;

a database of training missions stored in association with said at least one system server;

a mission resource database of mission resources including virtual tools, virtual network components and network components;

a trainer station comprising a processor, a video display and a trainer input device, the trainer station connected to the system server and communicating with the student station;

a trainer interface presented at the trainer station, the trainer interface presenting a duplicate of at least a portion of information presented at the student station to provide to a trainer a real-time view of activity of a student on the student station;

a game server which is configured to receive input from the student station or from the trainer station of a selected one of the training missions stored in the database of training missions;

non-transitory machine-readable code stored in said system memory and executable by said system processor of said system server to implement, in the following order:

A) a mission preparation phase comprising the presentation of information to said student via said player station to prepare the student for the selected training mission;

B) a mission execution phase in which the training mission is implemented, said training mission comprising a virtual mission environment created by the selected training mission and mission resources, the training mission including parameters that are randomized each time the training mission is created, and further configured to provide an in-mission interface to monitor student progress and changes in the mission, including based upon inputs received from said student during said training mission, the virtual mission environment comprising one or more virtual elements comprising one or more of a virtual network and a virtual system, a virtual device and a virtual tool for use by the game server in implementing said selected training mission as a game, said game server configured to cause said at least one student station to display information regarding said virtual mission environment to said student; and C) an assessment phase configured to provide an assessment to the student via the student station of an outcome of the mission.

2. The system of claim 1, wherein in the mission preparation phase, the student is presented with a video associated with the selected mission.

3. The system of claim 2, wherein the video present information regarding one or more of: 1) a mission backstory; 2) a mission order including one or more objectives, tools, rules of engagement, and mission intelligence; 3) rules of engagement; 4) intelligence about threat actors that might be encountered during the mission; 5) team set-up for the mission; 6) skills required for the mission; 7) cyber games to play prior to the mission; 8) tools requested for the mission; and 9) quizzes to take to verify mission understanding and/or tool qualifications for the mission.

4. The system of claim 3, wherein the mission order comprising at least one of: a) a situation including mission events, general network information for the mission, adversaries of interest for the mission, and cyber threats to expect during the mission, b) mission detail, c) mission execution, e) mission service and support including what the student is provided with and where the student enters the mission, and e) mission command and control including chain of command and means of communication for the mission.

5. The system of claim 1, wherein in the mission preparation phase comprises presentation of a battleroom to the student via the student station, the battleroom configured as training environment for the selected mission.

6. The system of claim 1, wherein the mission execution phase is configured to present at least one of: 1) objectives to be performed on the mission; and 2) an in-game artificial intelligence advisor to support the student or inject information to the student during the mission.

7. The system of claim 1, wherein the mission execution phase comprises storing a student profile comprising: a) a student background, wherein said student background is correlated to one or more of expertise, student age, student gender, student education, student cyber skills or certifications, student current job, and information associated with the student's specific knowledge, skills and abilities gained in training, and b) mission play information that can be utilized in future mission assessments.

8. The system of claim 1, wherein the mission execution phase introduces variability into the selected mission each time the selected mission is implemented.

9. The system of claim 8, wherein variability is introduced into the selected mission by changing elements used in the selected mission.

10. The system of claim 1, wherein the mission execution phase further comprises defining a mission scope of play, a mission environment, a threat actor, and selecting mission elements.

11. The system of claim 10, wherein the scope of mission play is defined based on one or more of: student knowledge, student skills and abilities, mission tasks, mission conditions, mission standards, mission offense/defense tactics, and/or single or team mission training.

12. The system of claim 10, wherein the mission environment is defined based on one or more of: a mission domain including infrastructure; mission terrain including one or more of business processes, systems emulated, user behavior and data; and/or enterprise IT comprising one or more of types of computers, operating systems, services allowed, defense posture, cybersecurity tools and processes used in the mission.

13. The system of claim 10, wherein the threat actor is selected based on evaluating or selecting one or more of: emulated threat actor tactics, techniques, procedures (TTPs); adversary goals including confidentiality, integrity, and availability; and scenario context and threat intelligence information.

14. The system of claim 10, wherein the mission elements are selected based on evaluating or selecting one or more of: a network diagram and key terrain of the mission; student tasks, conditions, and standards of the mission; variability of the mission; artificial intelligence requirements of the mission; and student artifacts including the mission order and mission rules of engagement.

15. The system of claim 1, wherein the assessment phase presents the user with an assessment scene via a user interface.

16. The system of claim 15, wherein the assessment scene includes a depiction of the network used in the selected mission.

17. The system of claim 16, wherein the assessment scene further includes a list of mission objectives, a set of control buttons and a time slider allowing the student to replay mission events.

18. The system of claim 16, wherein in the assessment scene the student and/or trainer can view a timeline of the student inputs and mission events by highlighting a relevant network element in an assessment network map.

19. The system of claim 17, wherein in the assessment scene mission objectives in the list of mission objectives are initially all a same color, and individual mission objectives change color when the corresponding mission objective is achieved or denied.

20. The system of claim 14, wherein the assessment phase comprises presentation to the student of at least one of: skill points, badges and a mission score to the student.

* * * * *